(12) United States Patent
Mikaelian et al.

(10) Patent No.: US 12,502,564 B2
(45) Date of Patent: Dec. 23, 2025

(54) RADIOFREQUENCY ENABLED FILTERING FACEPIECE RESPIRATOR

(71) Applicants: Andrew J. Mikaelian, Westlake Village, CA (US); Nyree S. Masoian, San Ramon, CA (US); Danielle K. Mikaelian, Westlake Village, CA (US)

(72) Inventors: Andrew J. Mikaelian, Westlake Village, CA (US); Nyree S. Masoian, San Ramon, CA (US); Danielle K. Mikaelian, Westlake Village, CA (US)

(*) Notice: Subject to any disclaimer, the term of this patent is extended or adjusted under 35 U.S.C. 154(b) by 1042 days.

(21) Appl. No.: 17/483,159

(22) Filed: Sep. 23, 2021

(65) Prior Publication Data

US 2022/0088424 A1 Mar. 24, 2022

Related U.S. Application Data

(60) Provisional application No. 63/082,443, filed on Sep. 23, 2020.

(51) Int. Cl.
| | |
|---|---|
| A61M 16/20 | (2006.01) |
| A41D 13/11 | (2006.01) |
| A62B 9/00 | (2006.01) |
| A62B 18/08 | (2006.01) |
| A62B 18/10 | (2006.01) |

(Continued)

(52) U.S. Cl.
CPC .............. *A62B 18/10* (2013.01); *A41D 13/11* (2013.01); *A61M 16/202* (2014.02); *A62B 9/006* (2013.01); *A62B 18/084* (2013.01); *A62B 23/025* (2013.01); *F16K 15/148* (2013.01); *F16K 15/1825* (2021.08); *H04Q 9/00* (2013.01); *H04Q 2209/40* (2013.01)

(58) Field of Classification Search
CPC ....... A62B 18/00; A62B 18/10; A62B 18/084; A62B 9/00; A62B 9/006; A62B 23/025; A61M 16/20; A61M 16/201; A61M 16/202; F16K 15/1825; F16K 15/148; A41D 13/11; H04Q 9/00; H04Q 2209/40
See application file for complete search history.

(56) References Cited

U.S. PATENT DOCUMENTS 9,974,920 B2 * 5/2018 Schneider ............ C01B 13/0259
11,844,898 B2 * 12/2023 Grashow .................. A61B 5/02
(Continued)

FOREIGN PATENT DOCUMENTS

WO WO-2018211474 A1 * 11/2018 ........ A61M 16/0816

*Primary Examiner* — Timothy A Stanis
*Assistant Examiner* — Tyler A Raubenstraw
(74) *Attorney, Agent, or Firm* — ONE LLP

(57) ABSTRACT

A radiofrequency enabled filtering facepiece respirator is provided. The filtering facepiece respirator includes a facemask adapted to fit over the nose and mouth of a wearer, where the facemask comprising a mask body containing a filtering structure. A harness is coupled to the mask body for securing the facemask on the face of the wearer. A mechanical valve is coupled to a portion of the mask body proximate the wearer's mouth, where the valve is adjustable between a first mode of operation and a second mode of operation. In the first mode of operation, air is permitted to flow through the valve on exhalation but not on inhalation. In the second mode of operation, air is obstructed from flowing through the valve on exhalation and inhalation.

17 Claims, 14 Drawing Sheets

(51) Int. Cl.
*A62B 23/02* (2006.01)
*F16K 15/14* (2006.01)
*F16K 15/18* (2006.01)
*H04Q 9/00* (2006.01)

(56) References Cited

U.S. PATENT DOCUMENTS

| | | | |
|---|---|---|---|
| 12,194,229 B2* | 1/2025 | Bender | A61M 11/002 |
| 2007/0155208 A1* | 7/2007 | Pirzada | A61B 5/0022 |
| | | | 439/144 |
| 2013/0104733 A1* | 5/2013 | Bangera | A62B 23/025 |
| | | | 128/206.12 |
| 2014/0338663 A1* | 11/2014 | Pirzada | A61B 5/1112 |
| | | | 128/204.23 |
| 2015/0273165 A1* | 10/2015 | Hadash | A61M 16/202 |
| | | | 128/203.14 |
| 2017/0150939 A1* | 6/2017 | Shah | A61M 16/0447 |
| 2017/0296772 A1* | 10/2017 | Costella | A61M 11/06 |
| 2017/0368279 A1* | 12/2017 | Doemer | A61M 16/00 |
| 2018/0078798 A1* | 3/2018 | Fabian | A62B 18/10 |
| 2018/0104438 A1* | 4/2018 | Jacobsen | A61M 16/1005 |
| 2018/0243592 A1* | 8/2018 | Gordon | A62B 18/084 |
| 2018/0318529 A1* | 11/2018 | Davidson | A61P 25/24 |
| 2018/0369616 A1* | 12/2018 | Dobbing | A62B 18/088 |
| 2020/0061399 A1* | 2/2020 | Wade | A62B 18/025 |
| 2020/0261683 A1* | 8/2020 | Parasco | A61M 16/202 |
| 2022/0000575 A1* | 1/2022 | Ugbeye | A41D 13/1138 |
| 2022/0071317 A1* | 3/2022 | Isgar | A42B 3/30 |
| 2022/0080228 A1* | 3/2022 | Webb | A62B 18/025 |

\* cited by examiner

RADIOFREQUENCY ENABLED FILTERING FACEPIECE RESPIRATOR

CROSS-REFERENCE TO RELATED APPLICATION

The present application claims priority under 35 USC § 119(e) to U.S. Provisional Patent Application No. 63/082,443, filed on Sep. 23, 2020, titled FILTERING FACEPIECE RESPIRATOR WITH AN ADJUSTABLE INHALATION-EXHALATION VALVE, the disclosure of which is hereby incorporated by reference in its entirety for all purposes.

TECHNICAL FIELD

The present disclosure generally relates to personal protective equipment, and more specifically, to a radiofrequency enabled filtering facepiece respirator having an adjustable inhalation-exhalation valve that is integrated into the mask body.

BACKGROUND

Filtering facepiece respirators are commonly worn over the mouth and nose of a person to prevent the individual from inhaling and/or exhaling microscopic particles, including infectious and non-infectious contaminants. The use of these devices has become much more common due to the recent SARS-CoV-2 (COVID-19) pandemic.

Breathing is critical for human survival. The lack of oxygen supply to the brain will cause permanent brain damage in as little as four minutes. Wearing a respirator restricts inhalations and exhalations by increasing the resistance to air flow when breathing. Conventional filtering facepiece respirators have either no valve or a valve that filters on inhalation but not on exhalation. These masks typically use a fine mesh of nonwoven polypropylene fabric for filtration but can also be made of cellulose and other nano-materials. Wearing a non-valved respirator can trap exhaled air with a lower oxygen concentration and a higher carbon dioxide level than room air. This trapped air is then repeatedly rebreathed, causing hypoxemia and hypercapnia. The resulting acute symptoms of these alterations in oxygen and carbon dioxide include dizziness and headaches, causing a reduction in work efficiency and can negatively affect decision making. Chronic hypoxemia and hypercapnia can exacerbate pre-existing cardiac, pulmonary, vascular, neurologic, and metabolic conditions.

Prior to the COVID-19 pandemic, over 3 million United States employees in approximately 1.3 million workplaces were required to wear some kind of respiratory protection. Since early 2020, this number has increased greatly. An N95 filtering facepiece respirator (FFR) certified by the National Institute for Occupational Safety and Health (NIOSH) is a type of respirator that removes particles from the air that is breathed through it. These respirators filter out at least 95% of very small (0.3 microns) particles. Other respirator filter classes include N99, N100, R95, R99, R100, P95, P99, and P100. N95 FFRs are capable of filtering out all types of particles, including bacteria and viruses. They are designed to reduce the wearer's inhalation exposure to these infectious microorganisms, as well as harmful particles in the environment. The vast majority of these respirators do not have an expiratory valve. An N95 respirator with an exhalation valve provides a similar level of protection to the wearer as one that does not have a valve. The presence of an exhalation valve reduces exhalation resistance, which makes it easier to breathe on exhalation. A respirator with an exhalation valve keeps the face cooler, reduces moisture build-up inside the facepiece, and does not trap exhaled air as readily as a non-vented respirator. However, respirators with exhalation valves should not be used in many situations. Examples include but are not limited to times where a sterile field must be maintained (e.g., during an invasive procedure in a surgical suite) or when in close proximity to another individual when sick or during a pandemic (e.g., when working in a meatpacking plant or visiting a hospital during a pandemic or when sick) because the exhalation valve may allow unfiltered contaminated exhaled air to escape. If one only has a respirator with an exhalation valve but requires filtration on exhalation, the valve can be covered with another mask (surgical or procedure mask) that does not interfere with the respirator fit. This approach, however, wastes personal protective equipment. The mask design described in this disclosure would not require the placement of a second mask. The user would change the setting on the switch or have it changed remotely to close the exhalation valve.

The Occupational Safety and Health Administration (OSHA) requires an annual fit test to confirm the fit of any respirator that forms a tight seal on the wearer's face before it is used in the workplace. Once a fit test has been done to determine the best respirator model and size for a particular user, a user seal check should be done every time the respirator is to be worn to ensure an adequate seal is achieved. Presently, medical and nonmedical users of these non-vented masks have to physically remove them to inhale fresh air. A major issue arises in medical settings when healthcare providers remove a mask that is contaminated. It is not uncommon for these individuals to remove their masks numerous times per day, and this can lead to the transmission of a pathogen to the mask user or another individual. Each and every time the respirator is removed, another user seal check must be performed. Adding an adjustable valve that will allow the free flow of air out or in and out of the mask will circumvent the need for removal to clear trapped air or get a breath of fresh air and reverse hypoxia and hypercapnia. This increases safety by decreasing the chance of transferring infectious pathogens and adds to work efficiency by omitting repeated user seal checks.

A need therefore exists for a filtering facepiece respirator that addresses the aforestated challenges yet is easy to operate in various modes of operations depending on the wearer's desired need. The development of filtering facepiece respirators with radio frequency (RF) capability, adjustable valves, and bio-sensors present an opportunity to advance individual respirator use. Integrating this piece of personal protective equipment with communication to a mobile device or into an indoor or outdoor intelligence platform FFR data can be captured and turned into actionable intelligence that is used to enhance user safety and user comfort.

SUMMARY OF THE INVENTION

A radiofrequency enabled filtering facepiece respirator is described herein. The filtering facepiece respirator includes a facemask adapted to fit over the nose and mouth of a wearer, where the facemask comprising a mask body containing a filtering structure. A harness is coupled to the mask body for securing the facemask on the face of the wearer. A mechanical valve is coupled to a portion of the mask body proximate the wearer's mouth, where the valve is adjustable between a first mode of operation and a second mode of operation. In the first mode of operation, air is permitted to flow through the valve on exhalation but not on inhalation. In the second mode of operation, air is obstructed from flowing through the valve on exhalation and inhalation.

A battery is electronically coupled to the mechanical valve. A wireless tag is electronically coupled to the battery. A controller is electronically coupled to the battery and the mechanical valve, where the controller is in wireless communication with a server having a processor and database.

The wireless tag communicates measurement data with one or more wireless signal collectors disposed at various locations within a facility. The one or more wireless signal collectors generate sense signals that are communicated to a gateway device to determine the geographical location of the filtering facepiece respirator within the facility.

The gateway device communicates with the server to transmit the geographic location information to the server, and the server communicates with the controller based on the geographic location of the filtering facepiece respirator. The controller transmits a controller signal to the mechanical valve to adjust the valve between the first mode of operation and the second mode of operation based on the geographic location of the filtering facepiece respirator within the facility.

In some embodiments, the processor comprises a database of coordinates corresponding to a floorplan of the facility.

In some embodiments, the mask body comprises a first porous layer and a filtering layer. In other embodiments, the mask body comprises a first porous layer, a second porous layer, and a filtering layer, where the filtering layer is disposed between the first porous layer and the second porous layer.

In some embodiments, each sense signal includes a measurement value associated with a particular filtering facepiece respirator, an identifier of a particular filtering facepiece respirator, and an identifier of the wireless signal collector.

In some embodiments, the valve comprises a valve housing having an interior chamber, a fixed hub member disposed within the chamber, a movable hub member disposed within the chamber, a pliable diaphragm disposed between the fixed hub member and the movable hub member, and a screw member disposed within the chamber extending along a longitudinal axis of the valve housing. The screw member is threadedly coupled to the movable hub member such that when the screw member is rotated about the longitudinal axis, either manually or by a motor, the threaded engagement between the screw member and the movable hub member causes the first movable hub member to translate axially along the longitudinal axis away from or towards the fixed hub member.

In some embodiments, in the first mode of operation the movable hub member is spaced apart from the fixed hub member, thus permitting an outer periphery of the diaphragm to be urged away from the fixed hub member under positive pressure and air is allowed to freely flow through the valve when the wearer exhales.

In some embodiments, the outer periphery of the diaphragm is drawn towards the fixed hub member under negative pressure to obstruct the flow of air through the valve when the wearer inhales.

In some embodiments, in the second mode of operation the movable hub member abuts the fixed hub member to secure the diaphragm therebetween, thus retaining an outer periphery of the diaphragm in contact with the fixed hub member to create a seal therebetween that obstruct air from flowing through the valve when the wearer exhales or inhales.

In some embodiments, a valve cap indicator may be coupled to a front portion of the valve housing. The valve cap indicator may include a plate of material inscribed with indicia indicating the state of airflow through the valve utilizing a colored indicator, label, light indicator, auditory system, or display.

In some embodiments, the diaphragm is made of a material that filters microscopic particulates.

In some embodiments, the controller is controlled by a mobile device via Bluetooth, WiFi, cellular, ultra-wideband, or RFID communications.

In some embodiments, the FFR includes smart sensors that detect oxygen saturation levels, carbon dioxide levels, nucleic acid levels, and volume of expired or inspired air. The smart sensors report data to a central server.

In some embodiments, the central server may use the smart sensor data to alert the user of a change in mask environment conditions.

A first method of managing the operation of a filtering facepiece respirator within a facility is also provided. The method includes the steps of providing a computing device having a processor and storage, where a database is stored in the storage; mapping the geographical coodinates of various rooms and common areas of the facility and storing the geographical coordinates in the database; and installing one or more signal collectors and one or more gateway devices in various geographical locations within the facility. The one or more signal collectors may be in electronic communication with the one or more gateway devices, and the one or more gateway devices may be in electronic communication with the computing device.

The method also includes storing in the database the geographical locations of the one or more signal collectors and the one or more gateway devices installed within the facility; and providing one or more target units having a transmitter. The one or more target units are carried by one or more targets traveling throughout the facility. The transmitter continuously transmits to the one or more signal collectors electromagnetic waves carrying messages or electronic signals. The one or more signal collectors processes the messages or electronic signals it receives from the one or more target units and transmits geographical data to the one or more gateway devices. The one or more gateway devices routes the geographical data to the computing device.

The method further includes processing the geographical data in the computing device and comparing the geographical data with the geographical locations of the one or more signal collectors and the one or more gateway devices stored in the database to determine relative geographic locations of the one or more targets within the facility; generating a controller signal in the computing device based on the relative geographic locations of the one or more targets; and transmitting the controller signal from the computing device to a receiver carried by a filtering facepiece respirator worn by the one or more targets. The controller signal adjusts the mode of operation of the filtering facepiece respirator.

In some embodiments, the controller signal adjusts the operation of the filtering facepiece respirator between a first mode of operation where air is permitted to flow through the valve on exhalation but not on inhalation and a second mode of operation where air is obstructed from flowing through the valve on exhalation and inhalation.

A second method of managing the operation of a filtering facepiece respirator within a facility is further provided. The method includes the steps of providing a computing device having a processor and storage, where a database is stored in the storage; mapping the geographical coodinates of various rooms and common areas of the facility and storing the geographical coordinates in the database; and installing one or more signal collectors and one or more gateway devices in various geographical locations within the facility. The one or more signal collectors are in electronic communication with the one or more gateway devices, and where the one or more gateway devices are in electronic communication with the computing device.

The method also includes storing in the database the geographical locations of the one or more signal collectors and the one or more gateway devices installed within the facility, and providing one or more target units having a transmitter. The one or more target units may be carried by one or more targets traveling throughout the facility. The transmitter continuously transmits to the one or more signal collectors electromagnetic waves carrying messages or electronic signals. The one or more signal collectors processes the messages or electronic signals it receives from the one or more target units and transmits geographical data to the one or more gateway devices. The one or more gateway devices routes the geographical data to the computing device.

The method further includes processing the geographical data in the computing device and comparing the geographical data with the geographical locations of the one or more signal collectors and the one or more gateway devices stored in the database to determine relative geographic locations of the one or more targets within the facility; generating target location data in the computing device; and transmitting the target location data to one or more client devices having a graphical user interface. The target location data may be displayed on the graphical user interface.

In some embodiments further include manually adjusting the operation of a filtering facepiece respirator worn by the target based on the location of the target. The operation of the filtering facepiece may be adjusted between a first mode of operation where air is permitted to flow through the valve on exhalation but not on inhalation and a second mode of operation where air is obstructed from flowing through the valve on exhalation and inhalation.

Other devices, apparatus, systems, methods, features, and advantages of the disclosure will be or will become apparent to one with skill in the art upon examination of the following figures and detailed description. It is intended that all such additional systems, methods, features, and advantages be included within this description, and be protected by the accompanying claims.

BRIEF DESCRIPTION OF THE FIGURES

The present invention may be better understood by referring to the following figures. Implementations of the invention are illustrated by way of example only and not limitation in the figures of the accompanying drawings. The components in the figures are not necessarily to scale, emphasis instead being placed upon illustrating the principles of the disclosure. In the figures, like reference numerals designate corresponding parts throughout the different views.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

FIGS. 1-15 illustrate examples of various embodiments of a radiofrequency enabled filtering facepiece respirator. Generally, the filtering facepiece respirator includes a facemask adapted to fit over the nose and mouth of a wearer, where the facemask comprising a mask body containing a filtering structure. A harness is coupled to the mask body for securing the facemask on the face of the wearer, and a mechanical valve is coupled to a portion of the mask body proximate the wearer's mouth. The valve is adjustable between a first mode of operation and a second mode of operation, where in the first mode of operation air is permitted to flow through the valve on exhalation but not on inhalation, and in the second mode of operation air is obstructed from flowing through the valve on exhalation and inhalation.

A battery is electronically coupled to the mechanical valve and a wireless tag is electronically coupled to the battery. A controller is electronically coupled to the battery and the mechanical valve, where the controller is in wireless communication with a server having a processor and database.

The wireless tag communicates measurement data with one or more wireless signal collectors disposed at various locations within a facility. The one or more wireless signal collectors generate sense signals that are communicated to a gateway device to determine the geographical location of the filtering facepiece respirator within the facility.

The gateway device communicates with the server to transmit the geographic location information to the server, and the server communicates with the controller based on the geographic location of the filtering facepiece respirator. The controller transmits a controller signal to the mechanical valve to adjust the valve between the first mode of operation and the second mode of operation based on the geographic location of the filtering facepiece respirator within the facility.

Filtering Facepiece Respirator

Figure 1:
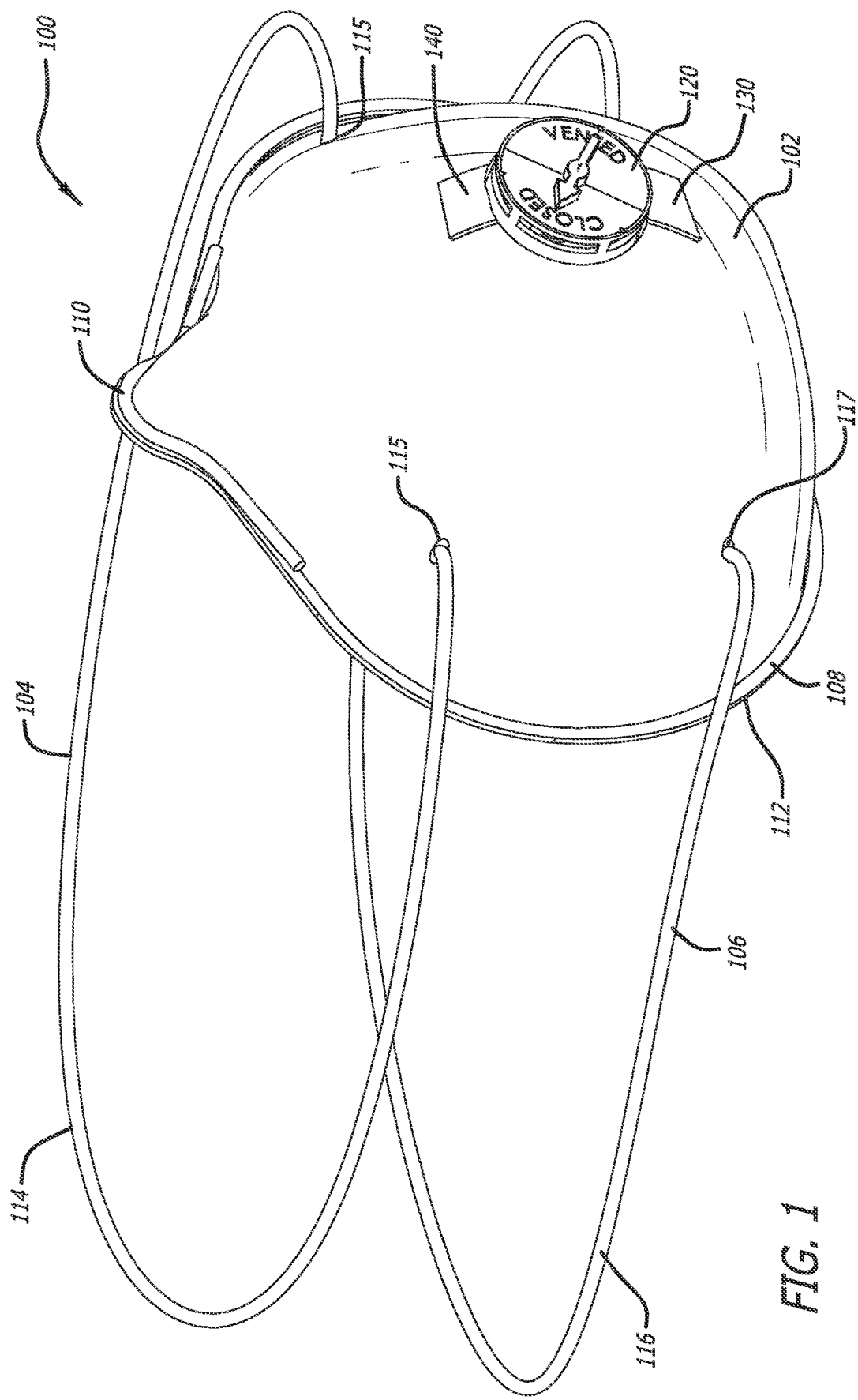
FIG. 1 is a perspective view of an example of a radiofrequency enabled filtering facepiece respirator in accordance with the teachings of the present disclosure.

FIG. 1 is a perspective view of an example of a radiofrequency enabled filtering facepiece respirator 100 according to the teaching of the present disclosure. As shown, the facepiece respirator 100 may include a facemask 102, an upper harness 104 coupled to an upper portion of the face mask 102, a lower harness 106 coupled to a lower portion of the facemask 102, a respiratory valve 120 coupled to a central front portion of the face mask 102, a wireless tag module 130, and a controller 140. In preferred implementations, the face mask 102 may include an outer contour 108 defined about the peripheral edge of the facemask 102 to substantially cover the nose and mouth of a wearer and a bendable reinforcement nosepiece 110 coupled to an upper portion of the outer contour 108. For purposes of simplicity, the facemask 102, upper harness 104, and lower harness 106 may be constructed similar to the facemask 102, upper harness 104, and lower harness 106 of facepiece respirator 100, thus, the details of these components will not be described further.

Figure 2:
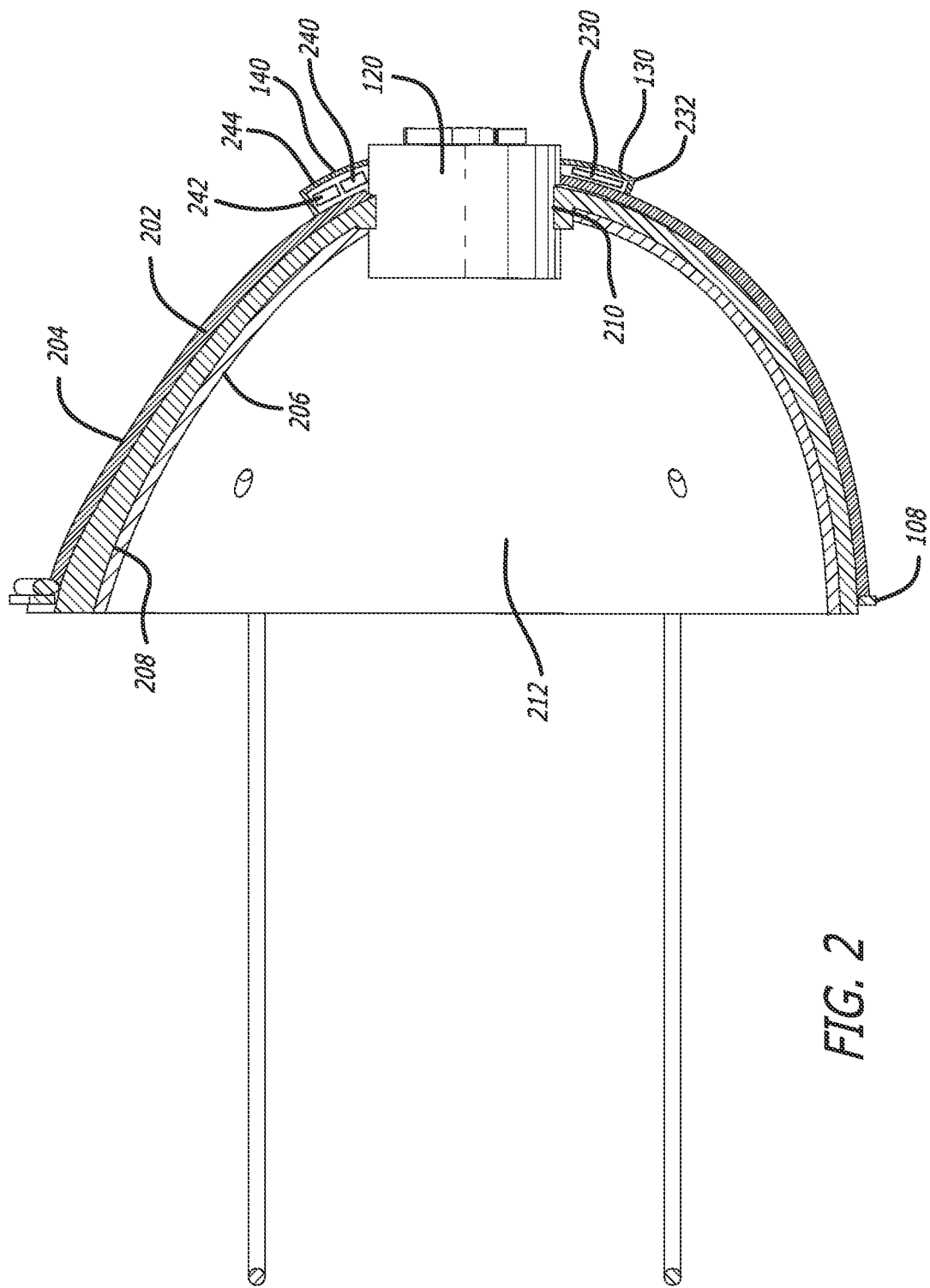
FIG. 2 is a cross-sectional view of the filtering facepiece respirator of FIG. 1.

FIG. 2 is a cross-section view of filtering facepiece respirator 100. As shown, the facemask 102 may include a substantially dome-shaped mask body 202 comprising an outer porous layer 204, an inner porous layer 206, a filtering layer 208, and a valve port 210 formed in a front central portion of the mask body 202. The inner layer 206 defines an interior cavity 212 for enclosing the nose and mouth of the wearer.

The outer porous layer 204 may be molded using polyester fibers. The layer serves as an outer support layer and pre-filter. The inner porous layer 206 may also be formed as a fiberfill shell and may also be molded using polyester fibers. While the outer porous layer 204 and the inner porous layer 206 are described herein as being made from polyester fibers, in other implementations, the outer porous layer 204 and the inner porous layer 206 may be made from any other permeable fabric or material.

The inner and outer layers 204 and 206 may be made of different or the same material. For example, the outer layer 204 may be formed of larger fibers than the inner layer 206 so that the inner layer 206, by being formed of finer fibers, may have a softer and therefore more comfortable surface to lie against the face of the wearer.

As shown, the inner and outer layers 204 and 206 are configured to sandwich the filtering layer 208. The filtering layer 208 may be formed from any known type of filter material so as to provide for the filtering of particular elements in the air. For example, the filtering layer 208 may be composed of nonwoven, interlaced polypropylene fibers, but can also be made of electrospun nanofibers, activated charcoal-treated sheets or sheets formed from charcoal particles, fiberglass material, cellulose, or other natural materials. The filtering layer 208 should preferably be electrostatic, hydrophobic, and water and droplet-proof.

In preferred embodiments, the filtering layer 208 should be adapted to trap particles having a size range of known contaminants or pathogens. The filter layer 208 material may be chosen in response to the specific contaminants or pathogens sought to be sieved.

In other embodiments, the filtering layer 208 may comprise two or more layers of material having different filtering specifications, such that one layer filters larger particles and the other layers filter the specific smaller particles of interest. This arrangement may affect various performance parameters of the facemask 102.

In this way, inner and outer layers 204 and 206 are intended to be more porous than the filtering layer 208 and are constructed to continually sanitize contaminant particles trapped by filtering layer 208. In addition, the inner and outer layers 204 and 206 may further serve to sanitize contaminants passing therethrough prior to reaching filtering layers 208.

The use of three layers 204, 206, and 208, as shown in FIG. 2, is illustrative only and may vary depending upon the specific application of the filtering facepiece 100 and its performance specifications. For example, it may be useful to construct a mask using only a single filtering layer 208 and only a single porous layer 204, such that the filtering layer 208 is located closer to the wearer than layer 204. Such an arrangement would provide a simple respirator mask that filters particulate contaminants and sanitizes them to protect the wearer of the facepiece. Likewise, a simplified mask may be constructed just using filtering layer 208 and porous layer 206, such that layer 206 is located closer to the wearer of such a facepiece. This arrangement would provide a surgical-type mask that traps and sanitizes contaminants exhaled by the mask wearer. It should also be kept in mind that layers 204 and 206 may be used in combination with one or more filtering layers 208 to provide a facepiece suitable for serving either as a respirator or a surgical mask. Finally, to aid in facial recognition, in some embodiments, portions of the three layers 204, 206, and 208 as shown in FIG. 2 can be replaced with clear or translucent plastic or silicone.

Turning back to FIG. 1, in some embodiments, the outer contour 110 may be lined with a deformable edge member 112 extending around the peripheral edge of the mask body 102. The edge member 112 may be made of silicone, thermoplastic polyurethane (TPU), polyvinyl, or other suitable material. More specifically, the edge member 112 may be formed from any compressible resilient polymer with either fast or slow recovery properties. The edge member 112 may be coupled to the outer contour 110 by glue, bonding, or other suitable means.

As better shown in FIG. 2, the three layers 204, 206, and 208 may be sealed together by any suitable means, such as ultrasonic welding, about the periphery of the mask body 202 and the edge member 112 may be disposed around the sealed periphery of the mask body 202. The edge member 112 provides a seal between the facemask 102 and the face of the wearer to prevent air from seeping into or out of the interior cavity 212 along the outer contour 110.

Returning to FIG. 1, the facemask 102 may be secured on the wearer's face by the upper and lower harnesses 104 and 106. The upper harness 104 may comprise an elastic member 114 made of a band or string of material coupled to an upper portion of the facemask 102 at each of its opposing ends 115. The elastic member 114 is configured to extend around the back of the head of the wearer. The elastic member 114 may be made of nylon, rubber, cloth, or any other elastic material. The elastic member 114 may be coupled to the facemask 102 by bonding, welding, or other mechanical means.

The lower harness 106 may comprise an elastic member 116 made of a band or string of material coupled to a lower portion of the facemask 102 at each of its opposing ends 117. The elastic member 116 is configured to extend around the back of the upper neck of the wearer. The elastic member 116 may be made of nylon, rubber, cloth, or any other elastic material. The elastic member 117 may be coupled to the facemask 102 by bonding, welding, or other mechanical means.

The upper and lower harnesses 104 and 106 may be made of elastic material to provide an adjustable fit. In some embodiments, the upper and lower harnesses 104 and 106 may be adjustable about the head of the wearer by adjustable buckle fasteners, fasteners straps, or any other suitable means. In other embodiments, one end of the harness may be coupled to an upper portion of the facemask 102, while an opposing end of the harness may be coupled to an upper portion of the facemask 102 such that each harness fits around the wearer's ears to secure the facemask on the wearer's face.

As shown in FIGS. 1 and 2, the respiratory valve 120 may be coupled to a front central portion of the facemask 102. In this way, while in use, the respiratory valve 120 is positioned in front of the mouth of the wearer. Alternatively, the respiratory valve 120 may be coupled to the side of the facemask to aid in facial recognition when portions of the three layers 204, 206, and 208 are replaced with clear or translucent plastic or silicone.

As better shown in FIG. 2, the respiratory valve 120 is configured to sit within the valve port 210 and the respiratory valve 120 may be fixed to the mask body 202 by bonding, weldment, glue, or any other suitable means. In other embodiments, the respiratory valve 120 may be detachably coupled to the mask body 202 at the valve port 210. The respiratory valve 120 can therefore be part of a disposable mask, fully reuseable mask, or a reuseable mask with disposable components.

As shown, valve 120 may have an annular-shaped construction. In other embodiments, valve 120 may have a polygonal-shaped construction. In any embodiment, the shape and dimensions of valve 120 preferable correspond to the shape and dimensions of the valve port 210.

Figure 3:
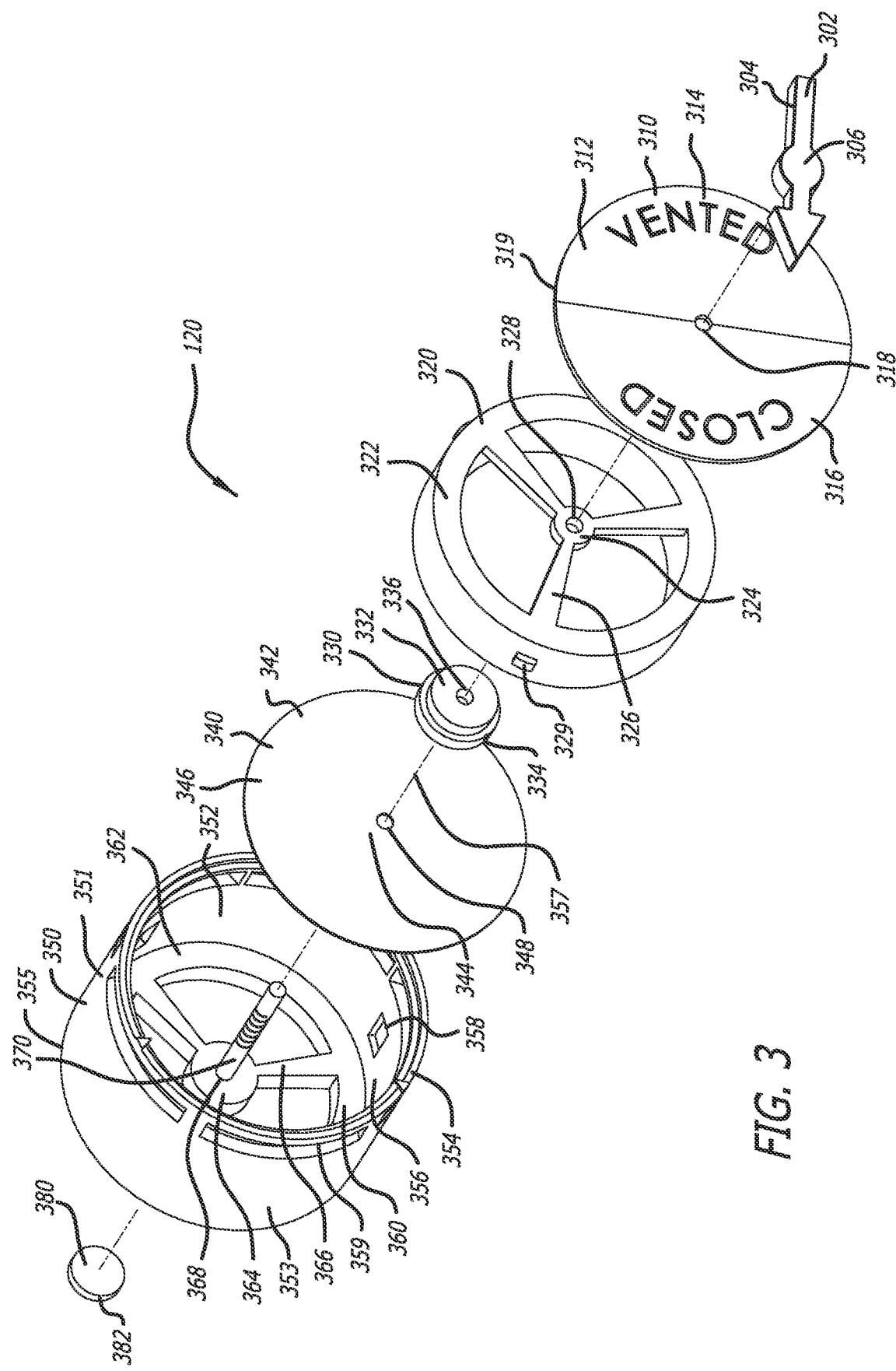
FIG. 3 is an exploded view of a respiratory valve of the filtering facepiece respirator of FIG. 1.

FIG. 3 is an exploded view of respiratory valve 120. In this example, the respiratory valve 120 is a motorized adjustable bi-mode valve. Moving from right to left, the respiratory valve 120 includes a rotatable pointer 302, a valve cap indicator 310, an outer hub 320, a multifunctional motor module 330, a diaphragm 340, a valve housing 350, and a multifunctional battery module 380.

As shown, the pointer 302 may comprise an arrow-shaped pointer body 304 and a pointer hub 306. The pointer 302 be constructed to suitable dimensions complementing indicia inscribed on valve cap indicator 310 to indicate to the wearer what operational mode the respiratory valve 120 is operating in. The pointer 302 may be constructed from plastic, aluminum, stainless steel, or any other suitable material.

The valve cap indicator 310 may comprise a thin-disc-shaped plate 312 having indicia 314 inscribed on its upper surface 316. In the embodiment shown, the indicia 312 includes the wording "VENTED" and "CLOSED" to correspond to the two modes of operation of the respiratory valve 120. In particular, the indicia 314, when the pointer 302 is positioned over the indicia, indicates to the wearer the mode of operation that the valve 120 is currently operating in.

The valve cap indicator 310 further includes a screw hole 318 for passing a screw member therethrough, as further described below, and an outer periphery 319. The outer periphery 319 is preferably constructed to diametrical dimensions that correspond to the diametrical dimensions of a first open end of the valve housing 350 such that the outer periphery 319 mates with an inner wall of the valve housing 350 to enclose the first end.

The valve cap indicator 310 may be constructed from plastic, aluminum, stainless steel, or any other suitable material. The indicia 314 may be inscribed or etched into the upper surface 316 of the valve cap indicator 310 or, in other embodiments, the indicia 314 may include stickers, light-emitting diodes, or may be painted on the of the upper surface 316 of the valve cap indicator 310.

Moving further downstream, the outer hub 320 comprises an annular construction having an annual rim 322 coupled to a central hub portion 324 by a series of spokes 326 extending therebetween. The central hub portion 324 includes a threaded screw hole 328 for engaging a screw member extending therethrough. Each spoke 326 may be substantially triangular in shape, such that its thickness gradually increases as the spoke 326 extends from the central hub portion 324 towards the annual rim 322.

The outer hub 320 may further include a series of stabilizing tabs 329 formed about the periphery of the annual rim 322 for mating with and translating within a corresponding series of elongated slots 358 formed in the annular wall of the valve housing 350. The stabilizing tabs 329 cooperate with the elongated slots 358 to guide the axial back-and-forth movement of the outer hub 320 along the length of the valve housing 350 and prevent the outer hub 320 from rotating as it is translated inside of the housing 350. The stabilizing tabs 329 are constructed to the dimensions and configured to fit within the elongated slots 329 to prevent the outer hub 320 from rotating as it is axially translated within the valve housing 350.

The outer hub 320 may be constructed to have a relatively thin thickness. For example, outer hub 320 may be constructed to a thickness of approximately 0.125 inches. The outer hub 320 may be constructed from plastic, aluminum, stainless steel, or any other suitable material.

The multifunctional motor module 330 may include a thin disc-shaped motor 332, a thin disc-shaped motor base 334, and an orifice 336 extending therethrough. The motor module 330 serves to secure an inner peripheral region of the diaphragm 340 to a central support structure in the valve housing 350 and to rotate an integrated screw member extending through the center of the valve 120, as described in further detail below. The motor 332 may comprise, for example, a low-profile rotary solenoid actuator, and the motor base 334 may be constructed from plastic, aluminum, stainless steel, or any other suitable material.

The motor module 330 may further include a motor controller (not shown) electronically coupled to the motor 332, for example, via electrical wiring. In other embodiments, the motor controller may be electronically coupled to the motor 332 via a wireless connection. The motor controller is configured to transmit signals to the motor 332 to activate the motor components, as discussed in more detail below.

Next, the diaphragm 340 may include a thin disc-shaped body 342 having an inner peripheral region 344, an outer peripheral region 346, and an orifice 348 extending therethrough. The diaphragm 340, when secured in close proximity to a central hub housed within the valve housing 350, forms a hermetic seal to prevent airflow through the respiratory valve 120, as described in further detail below. The diaphragm 340 is preferably constructed from rubber, latex, polymers, or any other non-porous pliable material.

In other embodiments, the diaphragm 340 may be constructed from filtering media. In particular, the diaphragm 340 may be made of porous material that filters microscopic particulates. In such embodiments, air may be filtered through the facemask 102 and the respiratory valve 120.

Moving further downstream, the valve housing 350 may comprise an annual body 351 having inner and outer annual walls 352 and 353 extending between a first open end 354 and an opposing open end 355. The inner annual wall 352 defines a chamber 356 for housing the diaphragm 340, motor module 330, and outer hub 320, and a longitudinal axis 357. The annual body 351 further includes a series of elongated slots 358 circumferentially disposed about the inner annual wall 352 and a series of arcuate-shaped vents 359 formed near the open end 354.

The elongated slots 358 are configured to receive corresponding stabilizing tabs 329 of the outer hub 320. The slots 358 are further constructed to dimensions corresponding to the width of the stabilizing tabs 329 to restrict the outer hub 320 from rotating as it is axially translated within the valve housing 350. The vents 359 are configured to allow air to pass into and/or out of the chamber 356.

A fixed hub 360 having an annular construction is coupled to the inner annual wall 352 in an aft portion of the chamber 356. In the embodiment shown, the fixed hub 360 integrally formed with the inner annual wall 352, but in other embodiments, the fixed hub 360 may be coupled to the inner annular wall 352 by bonding, welding, or any other suitable means.

The fixed hub 360 includes an annual rim 362 coupled to a central hub portion 364 by a series of spokes 366 extending therebetween. Each spoke 366 may be substantially triangular in shape, such that its thickness gradually increases as the spokes 366 extends from central hub portion 364 towards the annual rim 362.

The central hub portion 364 includes a tap hole 368 extending substantially therethrough. The tap hole 368 is positioned along the longitudinal axis 357. The tap hole 368 is constructed to receive an integrated screw member 370 extending therethrough along the longitudinal axis 357. As better shown in FIG. 4B, the integrated screw member 370 is an elongated cylindrical body 402 having a first end 404, an opposing end 406, a threaded portion 408 extending between the first end 404 and the opposing end 406. As discussed in further detail below, the threaded portion 408 is threadedly coupled to the outer hub 320 to translate the hub axially along the longitudinal axis 357 as the integrated screw member 370 is rotated clockwise or counterclockwise.

Returning to FIG. 3, the multifunctional battery module 380 may comprise a body 382 comprising a thin-disc construction. In other embodiments, the body 382 of the multifunctional battery module 380 may be constructed to other geometrical shapes. As better shown in FIG. 4B, the multifunctional battery 380 may be coupled to a surface of the central hub portion 364 by bonding, welding or other mechanical means. The multifunctional battery module 380 may be electrically coupled by wiring to the multifunctional motor module 330 to power the motor 332 and electronic circuitry (not shown) controlling the motor 332. In other embodiments, the multifunctional battery module 380 and the multifunctional motor module 330 may include other features, such as, but not limited to, wireless communications between the facepiece and a mobile device or computer and the monitoring of air quality within the facemask.

Figure 4A:
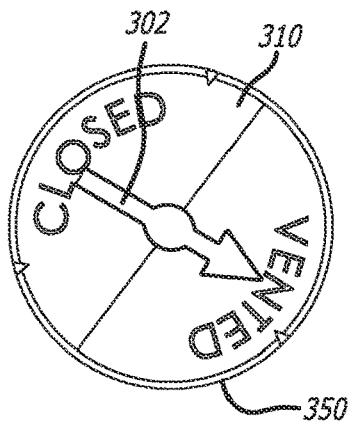
FIG. 4A a front view of the respiratory valve of FIG. 3 in a "vented" mode of operation.
Figure 4B:
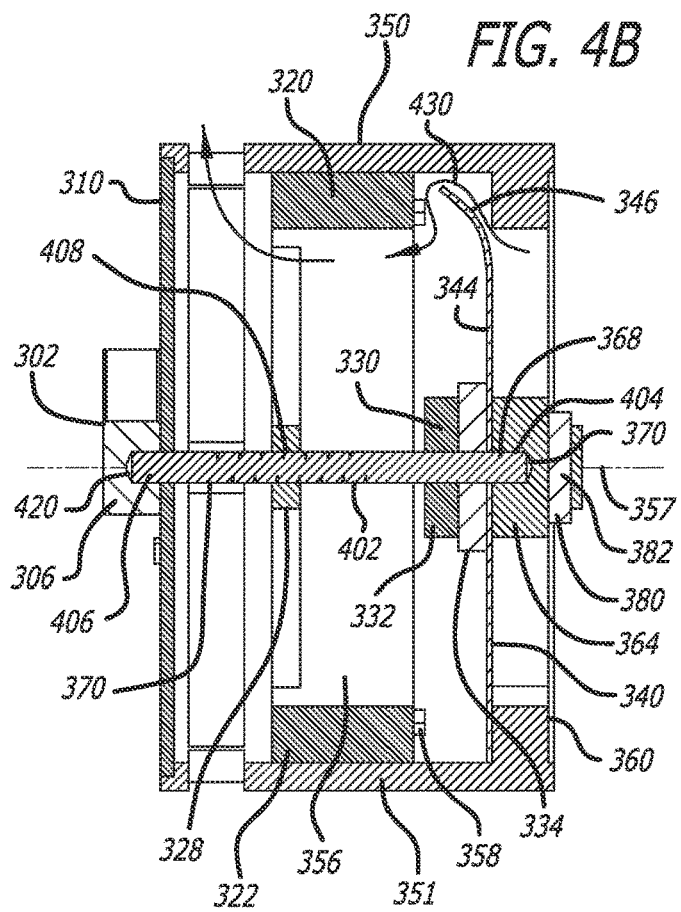
FIG. 4B is a cross-sectional view of the respiratory valve of FIG. 3 in the "vented" mode of operation.

The respiratory valve 120 may be operable in two modes of operation: a vented mode and closed mode. FIGS. 4A and 4B illustrate the respiratory valve 120 in the vented mode.

As shown, the integrated screw member 370 is configured to extend the entire length of the respiratory valve 120 (i.e., from the valve cap indicator 310 to the fixed hub 360) along the longitudinal axis 357. At one end, the opposing end 406 of the screw member 370 may be attached to the rotatable pointer 302 at a seat 420 formed in the bottom of the pointer hub 306. The pointer 302 may be attached to opposing end 406 by a sealant, glue, bond, snap-fit, interference fit, or other suitable means. The motor 332 is configured to rotate the integrated screw member 370 and the attached pointer 302 between a vented mode position and a closed mode position via electronic circuitry (not shown).

On the opposite end, first end 404 may be received by the tap hole 368 in the central hub portion 364 of the fixed hub 360. In some embodiments, the tap hole 368 may be dimensioned such that the first end 404 of the integrated screw member 370 is permitted to rotate freely within hole 368. In other embodiments, the first end 404 of the integrated screw member 370 may be rotatably coupled to roller bearings installed in the tap hole 368.

As further shown, the inner peripheral region 344 of the diaphragm 340 may be fixedly attached to a surface of the central hub portion 364 by, for example, glue, sealant, or bonding. Similarly, the base 334 of the motor module may be fixed atop the inner peripheral region 344 of the diaphragm 340 by, for example, glue, sealant, or bonding. According to this construction, the inner peripheral region 344 of the diaphragm 340 is fixed in place, while the outer peripheral region 346 of the diaphragm 340 may be permitted to be urged or otherwise moved away from spokes 366 and annular rim 362 of the fixed hub 360, thus permitting air to flow around the diaphragm 340 and through the valve chamber 356.

Upstream, the male threads of the threaded portion 408 of the screw member 370 are configured to engage the female threads of the threaded screw hole 328 of the outer hub 320 to translate the hub axially along the longitudinal axis 357 as the screw member 370 is rotated clockwise or counterclockwise. The stabilizing tabs 329 (FIG. 3) are configured to mate or fit within the elongated slots 358 to guide the outer hub 320 as it translates within the chamber 356 and, further, prevents the outer hub 320 from rotating about the screw member 370 as the outer hub 320 is axially translated.

In the vented mode, the outer hub 320 is positioned along longitudinal axis 357 such that its annual rim 322 of the outer hub 320 is spaced apart from the annular rim 362 of the fixed hub 360. In this position, the spacing between annual rim 322 and annular rim 362 permits the outer peripheral region 346 of the diaphragm 340 to be lifted or urged away from the annular rim 362 and spokes 366 of the fixed hub 360 by air pressure when the wearer exhales, however, the outer peripheral region 346 of the diaphragm 340 is drawn towards the fixed hub 360 by negative pressure to form a seal with annual rim 362 when the wearer inhales. In this mode, exhaled air is permitted to pass around the diaphragm 340 and is exhausted through vents 359, as shown by arrows 430, thereby improving user comfort when the wearer exhales. But ambient air is prevented from passing through the valve 120 when the wearer inhales. This permits the wearer to exhale air through the valve 120 with minimal effort, but ambient air must be filtered through the filtering layer of the facemask 102 when the wearer inhales.

Figure 5A:
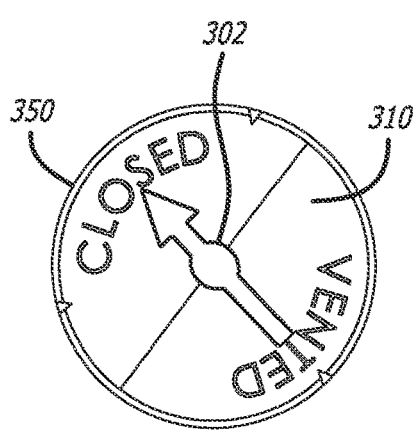
FIG. 5A is a front view of the respiratory valve of FIG. 3 in a "closed" mode of operation.
Figure 5B:
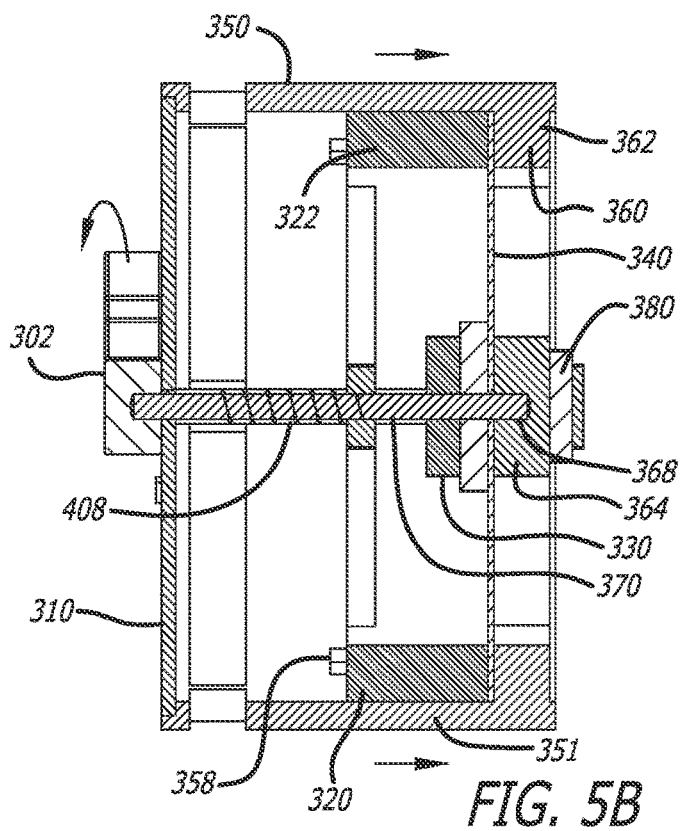
FIG. 5B is a cross-sectional view of the respiratory valve of FIG. 3 in the "closed" mode of operation.

FIGS. 5A and 5B illustrate respiratory valve 120 in the closed mode. In this mode, the integrated screw member 370 and the attached pointer 302 are rotated clockwise from the vented mode position by a motor controller (not shown) electrically connected to the motor module 330. In particular, as the motor controller is commanded by the wearer to operate in the closed mode, the controller transmits an electric signal to the motor module 330 to start the motor 332 and the motor 332 rotates the screw member 370 clockwise from a vented position to a closed position. Commands may be transmitted by the wearer to the motor controller by, for example, wireless connection, such as a mobile application stored on and activated from a mobile device. When the wearer decides that it wants to return the mask back to is vented mode of operation, the wearer may activate the controller to reserve the motor 332, thus rotating the screw member 370 counterclockwise from the closed position to the vented position.

Other embodiments may include additional functions of the multifunctional motorized motor module 330 include, but are not limited to, communication (e.g., via radiofrequency) to and from the mask and sensing (e.g, via biosensors) of conditions within the mask. These intramask bio-sensors monitor vital user credentials and parameters and alerts can be sent via the RF functionality if a credential or parameter has been violated and adjustments can be made in the valve settings, as discussed in further detail below.

As the screw member 370 is rotated clockwise, the male threads of the threaded portion 408 of the screw member 370 engage the female threads of the threaded screw hole 328 of the central hub portion 324 of the outer hub 320 to axially translate the outer hub 320 towards the fixed hub 360. When the outer hub 320 is translated to the closed mode position, the annual rim 322 of the outer hub 320 is positioned proximate to or abutting the annular rim 362 of the fixed hub 360. In this position, the outer peripheral region 346 of the diaphragm 340 is sandwiched between the annular rim of the outer hub 322 and the annular rim of the fixed hub 362 such that the diaphragm 340 is secured against the annual rim of the outer hub 322 and annular rim of the fixed hub 362 and the spokes 366 of the fixed hub 360. In this mode, the valve 120 is completely sealed and air is prevented from passing in or out of the valve 120 when the wearer inhales and exhales. Thus, air will only pass through the filtering layers of the facemask 102 when the wearer inhales and exhales, for optimum safety.

In sum, to close the valve 120, the adjustable dial 302 is turned clockwise and the outer hub 320 is advanced towards the center of the valve. When the adjustable dial 302 is completely turned and reaches a stop, the outer hub 320 will have secured the diaphragm 340 against the fixed hub 360, completely sealing the valve 120. When the adjustable dial 302 is turned in the opposite direction (i.e., counterclockwise), the outer hub 320 is moved away from the fixed hub 360. When the adjustable dial 302 is completely turned in the opposite direction and reaches a stop the diaphragm 340 is not secured to the fixed hub 360 by the outer hub 320 and the valve 120 is vented and allows air to pass through the valve 120 during exhalation, but not during inhalation.

As illustrated in FIGS. 4 and 5, when the adjustable dial 302 is rotated clockwise from the vented mode position to the closed mode position, the distance between the outer hub 320 and the fixed hub 360, gradually narrows until the outer hub 320 abuts the fixed hub 360. As the distance between the outer hub 320 and the fixed hub 360 narrows, the outer periphery of the diaphragm 340 becomes more restricted from being lifted or urged away from the spokes 363 of the fixed hub 360 by air pressure. Thus, as the adjustable dial 302 is rotated clockwise, breathing through the valve 120 becomes more restricted for the wearer until air is no longer permitted to pass in and out of the valve 120 in the closed mode. Therefore, the wearer may adjust the adjustable dial 302 clockwise or counterclockwise until the suitable level of breathing comfort is obtained.

Returning to FIG. 2, the wireless tag module 130 may include a transmitter 230 enclosed within a housing 232. The transmitter 230 may comprise an electronic device that generates and transmits electromagnetic waves carrying messages or RF signals to a signal collector, as described in futher detail below.

The module housing 232 may comprise a substantially rectangular construction or any other suitable shape. The module housing 232 may be constructed from plastic, polyvinyl chloride (PVC), or any other suitable material.

The wireless tag module 130 is preferably coupled to an outer surface of the facemask body 202, just below the respiratory valve 120. But, in other embodiments, the wireless tag module 130 may be coupled to the outer surface of the facemask body 202 at other locations, or along an inner surface facemask body 202.

The controller 140 may include a controller circuit 240 and a receiver 242 enclosed within a controller housing 244. The controller circuit 240 may comprise an electronic circuit electrically coupled, via electronic wiring or wireless connection, to the motor module 330 to activate components of the motor 332, as described in futher detail below. The receiver 230 may comprise an electronic device, for example, a high bandwidth antenna, that receives electromagnetic waves carrying messages or signals from a server transmitter, as described in futher detail below.

The controller housing 244 may comprise a substantially rectangular construction or any other suitable shape. The controller housing 244 may be constructed from plastic, polyvinyl chloride (PVC), or any other suitable material.

The controller 140 is preferably coupled to an outer surface of the facemask body 202, just above the respiratory valve 120. But, in other embodiments, the controller 140 may be coupled to the outer surface of the facemask body 202 at other locations, or along an inner surface facemask body 202.

System for Controlling the FFR

Aspects of the embodiments will now be presented with reference to a system and method for operating an FFR. These system and method will be described in the following detailed description and illustrated in the accompanying drawings by various blocks, components, circuits, steps, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, central processing units (CPUs), digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM), or other optical disk storage, magnetic disk storage, solid-state memory, or any other data storage devices, combinations of the aforementioned types of computer-readable media, or any other medium that can be used to store computer-executable code in the form of instructions or data structures that can be accessed by a computer.

The present teachings are generally concerned with a real-time location system (RTLS) that enables detecting and tracking the current geographical location of a target, whether indoors or outdoors. However, in other embodiments, radio frequency identification (RFID) may be used to detect and track the current geographical location of a target. The term "target" shall be construed to mean any movable object such as an individual, equipment, medical records, mobile device, wireless tag, mote device, and so forth. The RTLS is a multi-protocol system integrating Wi-Fi®, Bluetooth®, Ultra-Wide Band (UWB), Ethernet, Machine-to-Machine protocols, any other wireless technologies, or any combinations thereof. The present teachings also provide for automated remote controlling of FFR. Yet other aspects of this disclosure provide for location analytics of data gathered by the RTLS. The location analytics can provide for visual representations of real-time location tracking, foot traffic metrics, dwell time metrics, air quality, and so forth. Thus, the present teachings may be used in many applications, including, but not limited to, customer behavior analytics, indoor guidance or navigation services, personal protective equipment (PPE) management, asset and personnel location tracking, facility access control, and so forth.

The RTLS includes several hardware and software components. First, the RTLS may include one or more beacon devices or WiRange devices, which are collectively referred herein to as "wireless signal collectors" for simplicity. The wireless signal collectors are configured to collect wirelessly received signals from mobile devices (e.g., smartphones, tablet computers, smartwatches, and wearables) or wireless tags (e.g., RFID devices, BLE devices, Wi-Fi devices, Wi-Fi HaLow devices, wireless mote devices, iBeacon devices, and so forth), process ranging information of these signals, and further propagate it to a central server for RTLS calculations. The wireless signal collectors integrate several wireless technologies in a single box. For example, the wireless signal collectors can be configured to receive Wi-Fi® signals (e.g., simultaneous 2.4 GHz and 5 GHz Wi-Fi sniffing based on IEEE 802.11 standards), Bluetooth® signals (e.g., with iBeacon® and Eddystone® protocol provisioning), and UWB (IEEE 802.15.4-2011) signals. In some embodiments, there can be a two-way communication link between these wireless signal collectors and mobile devices and wireless tags. Accordingly, the wireless signal collectors can also serve as a remote management gateway for wireless tags, which enables remote monitoring, configuration, and firmware upgrades for the wireless tags. The wireless signal collectors are stand-alone devices that can have an internal processing unit, memory, and network interface for communicating with one or more servers or computing devices. The wireless signal collectors are operable without the need to install mobile applications on mobile devices to enable their location tracking. Moreover, there is no need for the mobile device to be connected to a local Wi-Fi network so as to be tracked by the wireless signal collectors.

The wireless tags can refer to location tags, RFID tags, Near Field Communication (NFC) cards, wireless mote devices, WiBeat devices, BLE devices, Wi-Fi devices, Wi-Fi HaLow devices, iBeacon devices, and the like. The term "tag" shall be construed broadly to mean any electrical device suitable for practicing the embodiments described herein. Each wireless tag can have a unique identifier such as a Universally Unique Identifier (UUID), Major-Minor ID, BLE ID, Wi-Fi ID, and so forth.

In some embodiments, the wireless tags can include electronic devices for broadcasting wireless signals to the wireless signal collectors. The wireless signals can be repeatedly broadcasted (e.g., with a rate in a range from 0.1 Hz to 10 Hz) or they can be broadcasted in response to an inquiry received from a wireless signal collector. The wireless signals can be propagated up to about 300 meters with the transmission power from about −18 dBm to about 8 dBm. In some embodiments, the wireless tags support Ethernet standards, Bluetooth standards, including BLE standards, iBeacon standard, Eddystone standard, and the like. The wireless tags are stand-alone devices with an independent source of energy (e.g., a battery), processing means, memory, and radio interface for broadcasting wireless signals. The wireless tags can be coupled, secured, glued, or fixed to any items of interest. For example, they can be attached to an article of PPE, medical records, individuals, and so forth. The wireless tags may also be managed remotely via the wireless signal collectors. The remote management can include software updates, maintenance, and support.

The RTLS can provide three different system architectures to enable tracking and monitoring of targets in real-time. According to a first example system architecture, mobile devices may act as wireless tags and emit wireless signals that are then collected by one or more wireless signal collectors and transmitted to the gateway device for further processing as described herein. According to a second example system architecture, the wireless tags emit wireless signals that are then collected by one or more wireless signal collectors and transmitted to the gateway device for further processing as described herein. According to a third example system architecture, the wireless tags emit wireless signals that are then collected by at least one of the mobile devices which act as signal collectors and gateway devices for determining a wireless tag location.

The central server provides a back-end RTLS engine service. The central server can be installed remotely. Alternatively, the central server can be installed on or near the premises of the area where location tracking is performed. Particularly, the central server receives the collected wireless signals from two or more wireless signal collectors and performs location calculations. The wireless signals include at least one measurement metric such as Received Signal Strength Indicator (RSSI), Time of Flight (ToF), or Time of Arrival (ToA). The location of one or more targets (e.g., individuals, mobile devices, or wireless tags) can be calculated by various means, including a multilateration procedure applied to measurement metric values from a selected cell, which are then applied to a least-squares analysis such as the Levenberg-Marquardt algorithm. The location data may be collected and stored by a controller server in data storage such as cloud storage or distributed memory.

The controller server can also provide location analytics based on the collected location data, including statistical data, facility maps, graphs, tables, various metrics, and so forth, which characterize behavior of multiple targets (e.g., medical staff, visitors, medical record, items in a facility, etc.) in a given area (e.g., a hospital, medical facility, senior housing facility, and the like) in real-time or over a predetermined period. The controller server is also connected to a web portal, which provides one or more graphical user interfaces (GUIs) for authorized clients, such as managers or officers of hospitals, medical facilities, retail stores, and the like. The web portal provides to the authorized clients visual representation of target locations in real-time and also visual representation of the statistical data, facility maps, graphs, tables, foot traffic metrics, or other metrics for further analysis. The web portal can also provide notifications, messaging, reporting, Point-of-Interest (POI) management, geo-fencing, maps creation and editing, indoor routing, user and device management, and so forth.

The real-time location of targets may also be used by the central server or other third-party services for proximity advertising, sending push notifications or messages to the targets, and so forth. For example, the central server can cause delivering to a mobile device of a particular individual a notice that the individual is in a clean room requiring certain safety restrictions.

Thus, the RTLS provides both the engagement and analysis of foot traffic in one or more predetermined areas, whether indoors or outdoors. The architecture of RTLS provides easy scaling to enterprise-grade applications involving thousands of wireless signal collectors and thousands of targets. These applications can be helpful not only for retail purposes or asset tracking, but also for analysis of pedestrian and vehicle traffic in given city areas, which can help to develop city infrastructure. For purposes of this disclosure, the terms "comprise," "comprising," "include," and "including" are interchangeable and not intended to be limiting. For example, the term "including" shall be interpreted to mean "including, but not limited to."

Additionally, it shall be understood that when an element is referred to as being "connected" or "coupled" to another element, it can be directly connected or coupled to the other element or it can be indirectly, but operatively, connected or coupled via one or more intervening elements.

The term "mobile device" shall mean any electronic device having a network interface and configured to emit wireless signals and optionally communicate with the wireless signal collectors and other devices. Some examples of mobile devices include, but not limited to, a cellular phone, mobile phone, smart phone, tablet computer, laptop computer, personal digital assistant, music player, multimedia player, portable computing device, navigation system, game controller, gaming device, game console, in-vehicle computer, infotainment system, entertainment system, and so forth. The term "mobile device" can also refer to a wearable device such as a fitness tracker, health monitor, smart watch, or any other electronic article with networking functionality that can be worn by an individual. In some embodiments, mobile devices can act as wireless tags and emit wireless signals that are then collected by wireless signal collectors. In other embodiments, mobile devices can act as wireless signal collectors for collecting wireless signals transmitted by wireless tags and as a gateway for processing the wireless signals.

The term "wireless signal" shall mean a radio frequency (RF) signal that can be transmitted at regular or irregular intervals within a predetermined frequency band.

The term "target" shall refer to any one of the following: an individual, FFR, mobile device, and wireless tag.

Figure 6:
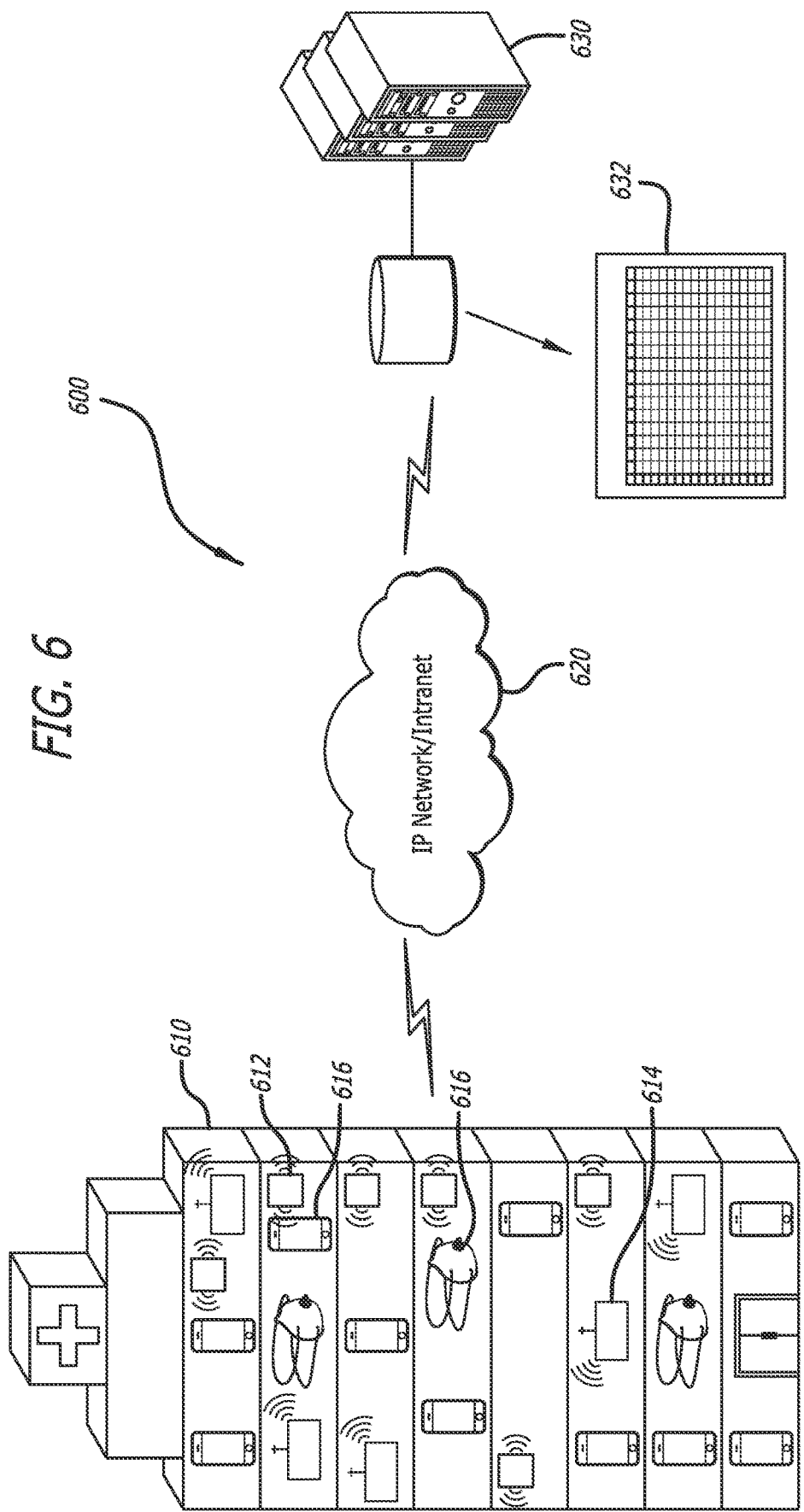
FIG. 6 is a schematic view of an environment for managing a radiofrequency enabled filtering facepiece respirator in accordance with the teachings of the present disclosure.

Referring now back to the drawings, exemplary embodiments of RTLS and method for controlling and monitoring a filtering facepiece respirator will be described. FIG. 6 is a schematic view that illustrates an example environment 600 for controlling and monitoring a filtering facepiece respirator where collecting real-time location data can be practiced. More specifically, FIG. 6 depicts a facility 610 where a plurality of wireless signal collectors 612 and gateway devices 614 are installed at various locations throughout the facility 610. In this example, the facility 610 is depicted as a hospital, but in other implementations, the facility may be a medical center, clinic, senior care facility, laboratory, office building, restaurant, or any other public or private facility.

The wireless signal collectors 612 are configured to receive signals from one or more targets 616 (e.g., FFRs and mobile units) throughout the facility, as will be discussed in further detail below. The wireless signal collectors 612 are further configured to communicate by wireless communication with one or more gateway devices 614, as will be discussed in further detail below. The gateway devices 614 are configured to communicate via Internet or Intranet connection 620 with a central server 630 having a database 632.

The database 632 may comprise information concerning the relative geographical location of each signal collectors 612 and gateway devices 614 within the facility. For example, the database 632 may record the location information for devices installed on a first floor of the facility, as follows:

| Unit ID | Device Type | Location | Designation |
|---------|-------------|----------|-------------|
| 1001 | signal collector | Operating Room 101 | clean room |
| 1002 | gateway device | Operating Room 101 | clean room |
| ... | ... | ... | ... |
| 1050 | signal collector | Hallway NS wing | common area |
| 1051 | gateway device | Hallway NS wing | common area |

In the present example, the "unit ID" may be a serial number or other identifier of a signal collector 612 or gateway device 614. The "device type" may identify whether the device is a signal collector or gateway device. The "location" may identify the area in the facility where the device is located. And, "designation" may identify the area environment. For example, a "clean room" may be an area requiring improved air quality so a person traveling through that area may be required to wear a surgical-grade facepiece to eliminate individual sources of pollution or contaminated particulates in the air. As such, a person may be required to wear a FFR in the closed mode of operation. However, the air quality in a "common area" may be less restrictive, to a person traveling through common areas may only be required to wear a FFR in the vented mode of operation. In that way, the mode of operation of a FFR worn by a person traveling through a facility may be automatically adjusted according to the air quality restrictions of each area within the facility, as will be discussed in further detail below.

To that end, a client user or administrator may use a GUI for a mobile device or computing device to display a building floor plan for an individual building. The floorplan may illustrate the interior layout and features of the building, and may, for example, be based on an interior building schematic. In a multi-story building, the displayed building floorplan may be based on a user-selected floor in a floor drop-down menu. The user interface may also provide information regarding the currently displayed layout or floorplan, such as the building's street address, which floor the target is located within that building, and a location on that floor (e.g. northwest corner). The displayed building floor plan may additionally be based on information indicative of which floor the target unit is currently on.

The displayed building floor plan may render an indication of the detected graphical location of the target unit and/or the user of the target unit. The detected location may be based on, for example, dead reckoning calculations performed by the target unit or on location data received by the target unit. The displayed building floor plan may also depict the locations of fixed wireless devices (e.g., wireless signal collectors or gateway devices). The depicted wireless devices may represent fixed wireless devices for which location and other information has been entered by a user or administrator, as described above.

A graphical user interface may be used by a user for reviewing and entering/editing location and other information for a selected fixed wireless device. For example, a user may enter descriptive information, such as the make and model of the fixed wireless device, specific location on the floor of the fixed wireless device, whether the fixed wireless device is a wireless access point, a gateway device, or a Bluetooth beacon, etc. For example, the user may enter the floor on which a fixed wireless device is located within the building. The floor information may be manually entered by the user, or the system may provide an estimated floor number (based, for example, on barometric information or dead reckoning) that is verified or corrected by the user. The user may also manually enter location information for the fixed wireless device. As described above, the location information may describe the room number in which the device is located, which corner of the building the device is nearest, whether there is any identifiable landmarks or features of the building interior (e.g., a sculpture or water feature) near to the fixed wireless device, etc. The location information may be manually entered by the user, e.g. when the user selects a particular field displayed by the interface, the target unit may display a touch-sensitive keyboard if no keyboard is currently provided to the user. In addition to, or alternatively, the system may provide an estimated floor location (e.g., coordinates within the floor) based on determinations made by the target unit device, which may be verified or corrected by the user.

Figure 7:
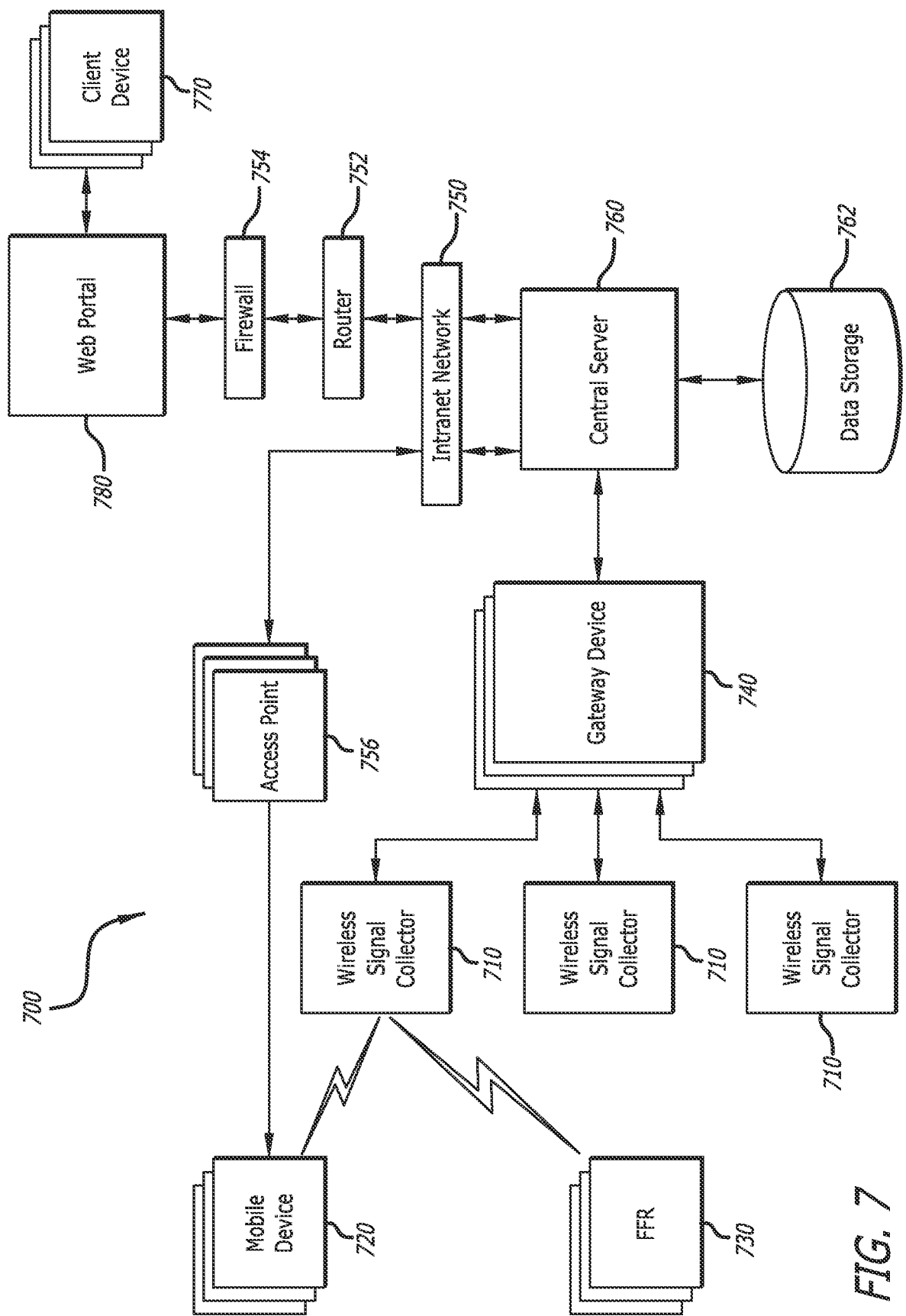
FIG. 7 is a schematic view of an example of a real-time location system for managing a radiofrequency enabled filtering facepiece respirator in accordance with the teachings of the present disclosure.

FIG. 7 is a schematic view illustrating an example of an RTLS 700 for controlling and monitoring a filtering facepiece respirator using real-time location data. The RTLS 700 comprises a plurality of wireless signal collectors 710. The wireless signal collectors 710 are generally operable to collect measurement data with respect to at least one of mobile devices 720 and FFRs 730 having wireless tags. For these ends, the wireless signal collectors 710 can be configured to receive wireless signals from the mobile devices 720 or FFRs 730 to produce measurement values such as RSSI values, ToF values, or ToA values. The wireless signals received from the mobile devices 720 or FFRs 730 can also bear an identifier of the mobile device 720 or FFR 730 with which a particular wireless signal is generated.

Once the wireless signal collectors 710 collect the measurement data from mobile devices 720 or FFRs 730, the wireless signal collectors 710 can generate sense signals. Each sense signal is associated with the wireless signal collector 710 that produced this sense signal and a particular mobile device 720 or FFR 730. Accordingly, each sense signal includes: (a) a measurement value associated with a particular mobile device 720 or FFR 730, (b) an identifier of this mobile device 720 or FFR 730, and (c) an identifier of the wireless signal collector 710.

Still referring to FIG. 7, the RTLS 700 further comprises one or more gateway devices 740. Each of the gateway devices 740 can be in operative communication with one or more of the wireless signal collectors 710 via one or more data networks. A data network can refer to any wired, wireless, or optical networks including, for example, the Internet, intranet, local area network (LAN), Personal Area Network (PAN), Wide Area Network (WAN), Virtual Private Network (VPN), Bluetooth® radio, Ethernet network, an IEEE 302.11-based radio frequency network, a Frame Relay network, Internet Protocol (IP) communications network, or any other data communication network utilizing physical layers, link-layer capability, or network layer to carry data packets, or any combinations of the above-listed data networks.

In some embodiments, the data network includes a corporate network, data center network, service provider network, mobile operator network, or any combinations thereof. Thus, the gateway devices 740 can be located remotely to an area where the wireless signal collectors 710 are employed. In other embodiments, however, the gateway devices 740 can be located in the proximity of the area where the wireless signal collectors 710 are employed. For example, one gateway device 740 can be provided within premises of the area (e.g., an operating room) where the wireless signal collectors 710 are employed.

In the example illustrated in FIG. 7, the data network may include an intranet network 750 coupled to a router 752 and firewall 754. The data network may also include one or more hotspots or wireless access points 756. A wireless access point 756 (WAP or AP) is a network hardware device that allows other wireless devices to connect to a wired network. The WAP usually connects to a router as part of a wired local area network (LAN). A single WAP can support numerous wireless devices. Because users may travel between buildings on a large campus, continuity must be retained both inside and outside via the WAPs. Anchors may also be implemented and are designed to detect and locate wireless devices and access points throughout indoor and outdoor spaces, across the RF spectrum. Thus, the WAP enables the target units, namely the mobile device 720 and FFR 730, to send and/or receive data using the wired connection.

Each of the gateway devices 740 is configured to collect the sense signals received from two or more of the wireless signal collectors 710 and provide location calculations. In some embodiments, there are needed at least three wireless signal collectors 710 for determining a location of a target. In other embodiments, however, even one wireless signal collector 710 may be sufficient for determining a location of a target.

The gateway device 740 calculates the current location of a particular target based on the sense signals associated with one and the same mobile device 720 (or FFR 730) and received from the wireless signal collectors 710. The gateway device 740 repeatedly aggregates the sense signals. For example, the sense signals can be collected in periods, which can be in a range from about 1 millisecond to about 100 seconds. Within each of the periods, the gateway device 740 can collect one or more sense signals. Further, the gateway device 740 may optionally select a predetermined number of the received sense signals over another period being greater than the periods for receiving the sense signals. For example, the gateway device 740 may select only those received sense signals that has a measurement value higher than a predetermined threshold value. The gateway device 740 may then associate the received sense signals with one or more cells.

In yet further embodiments, at least one of the mobile devices 720 can be configured to perform the functionality of the gateway device 740. Accordingly, in these embodiments, the mobile device 720 may calculate the current location of a particular target based on the sense signals received from the wireless signal collectors 710, where these sense signals can be associated with some other mobile devices 720 or one or more FFRs 730. The calculation of the current location by the mobile device 720 can be performed in a substantially the same manner as by the gateway device 740.

The gateway device 740 may measure sense signals over a predetermined period and then convert the sense signals into distance values (e.g., a distance in meters) to characterize distances between the wireless signal collector 710 to the target. Further, the gateway device 740 can calculate a cathetus based on the distance values. The cathetus can be further used to calculate the location coordinates of a target. If, for example, the RTLS includes only one wireless signal collector 710, the location coordinates of a particular target can be substantially identical to the location coordinates of the wireless signal collector 710 or some other predetermined coordinates associated with this wireless signal collector 710.

If several wireless signal collectors 710 are used in the RTLS, the cathetus of the wireless signal collector 710 is combined with at least one other cathetus associated with at least one other wireless signal collector 710 to perform multilateration. The output of the multilateration procedure includes one or more location coordinates of a particular target (e.g., an individual, mobile device 720, FFR 730). Further, the gateway device 740 can perform velocity smoothing operation with respect to the location coordinates to produce location information.

The location information is then supplied to a central server 760 via one or more data networks. The central server 760 also collects location information about other gateway devices 740, thereby aggregating location information of a plurality of targets within a plurality of areas. The location data may also be associated with a facility or particular entities. The term "entity" shall mean an organization, company, administration, owner, or individual that controls a particular area or premises with wireless signal collectors 710, which produce the sense signals used for the generation of location information. Therefore, in one example embodiment, the location information can be virtually linked to a hospital (i.e., an entity), where the wireless signal collectors 710 are deployed to track doctors, nurses, and other healthcare staff.

In certain embodiments, the central server 760 may store the location information in data storage 762. The data storage 762 can be a memory device of the central server 760 or a distributed memory (e.g., a cloud memory). The location information can be further available for accessing to by one or more client devices 770. The term "client device" shall mean any computing device with network functionality. For example, the client device 770 can include a desktop computer, workstation, laptop computer, tablet computer, mobile phone, smartphone, personal digital assistant, server, and so forth. The client device 770 can be controlled by authorized clients, which can include agents or officers of the entities described above, or by software applications via REST API. In certain additional embodiments, the central server 760 may also process the location information such as calculate statistical data (e.g., calculate foot traffic metrics).

Still referring to FIG. 7, the RTLS 700 further includes a web portal 780 which can be accessed by the authorized clients via the client devices 770. The web portal 780 may provide graphical user interfaces (GUIs) or a dashboard to display location data in real-time and also display past location data aggregated over a select period. In one example, the GUIs can display a map of at least one area associated with at least one entity. The map can include one or more icons characterizing the current geographical location of targets. The map can also include icons of wireless signal collectors 710 and gateway devices 740.

Furthermore, the web portal 780 may provide GUIs for displaying statistical data, such as foot traffic, target behavior patterns, counts of persons (patients, staff, visitors) in certain areas over a select period, target oxygen levels, air quality, and other metrics. The GUIs enable the authorized clients to review the statistical information for any desired time period and any desired area. The authorized clients can also use the web portal 780 to control, manage, and update the wireless signal collectors 710, and to control, manage, and update the gateway devices 740. The authorized clients can also use the web portal 780 to send medical data and patient information to a target based on current location information, and the like.

Figure 8:
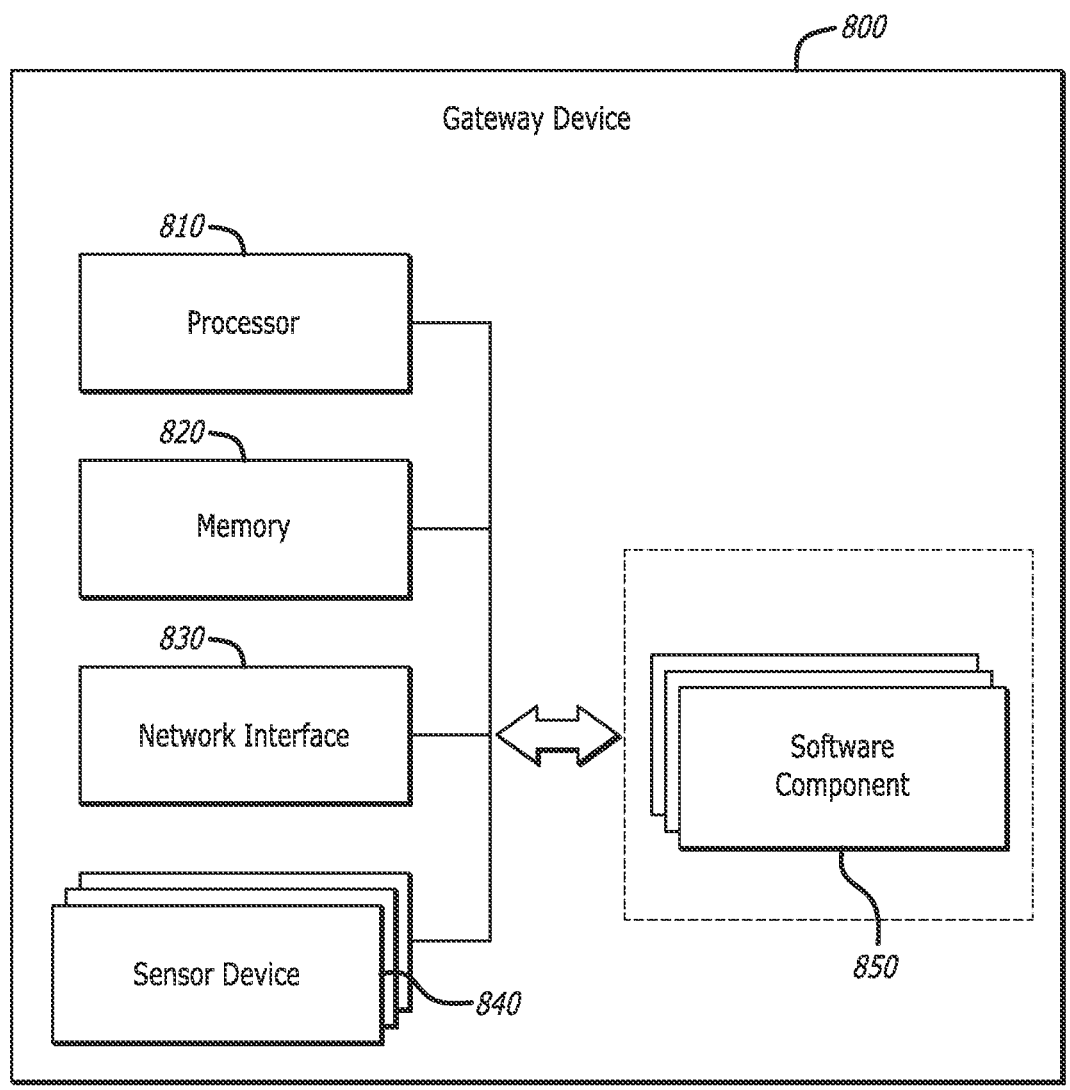
FIG. 8 is a schematic view of a gateway device for the real-time location system of FIG. 7.

FIG. 8 illustrates a gateway device 800, according to an example embodiment. The gateway device 800 may include at least one processor 810 and memory 820. Memory 820 stores, in part, instructions and data for execution by processor 810. Memory 820 can store the executable code when the gateway device 800 is in operation. The gateway device 800 may further include a network interface 830 and one or more sensing devices 840. The components of gateway device 800 can be connected via one or more communication buses or data transport means.

The network interface 830 can be utilized to communicate with external devices, external computing devices, servers, and networked systems via one or more data networks such as one or more wired, wireless, or optical networks including, for example, the Internet, intranet, LAN, WAN, cellular phone networks, Bluetooth® radio, and an IEEE 302.11-based radio frequency network, among others. For example, the network interface 830 provides data exchange with the central server 760.

The sensing devices 840 are configured to produce the sense signals as described above. For these ends, the sensing devices 840 can be operable to receive wireless signals from mobile devices 720 or FFRs 730 and process the wireless signals to generate the sense signals.

The gateway device 800 may also include one or more software components 850, which can include processor-executable code or instructions stored in the memory 820. The software components 850 may include software, middleware, or firmware enabling the operation of the gateway device 800 to produce the sense signals as described herein.

Figure 9:
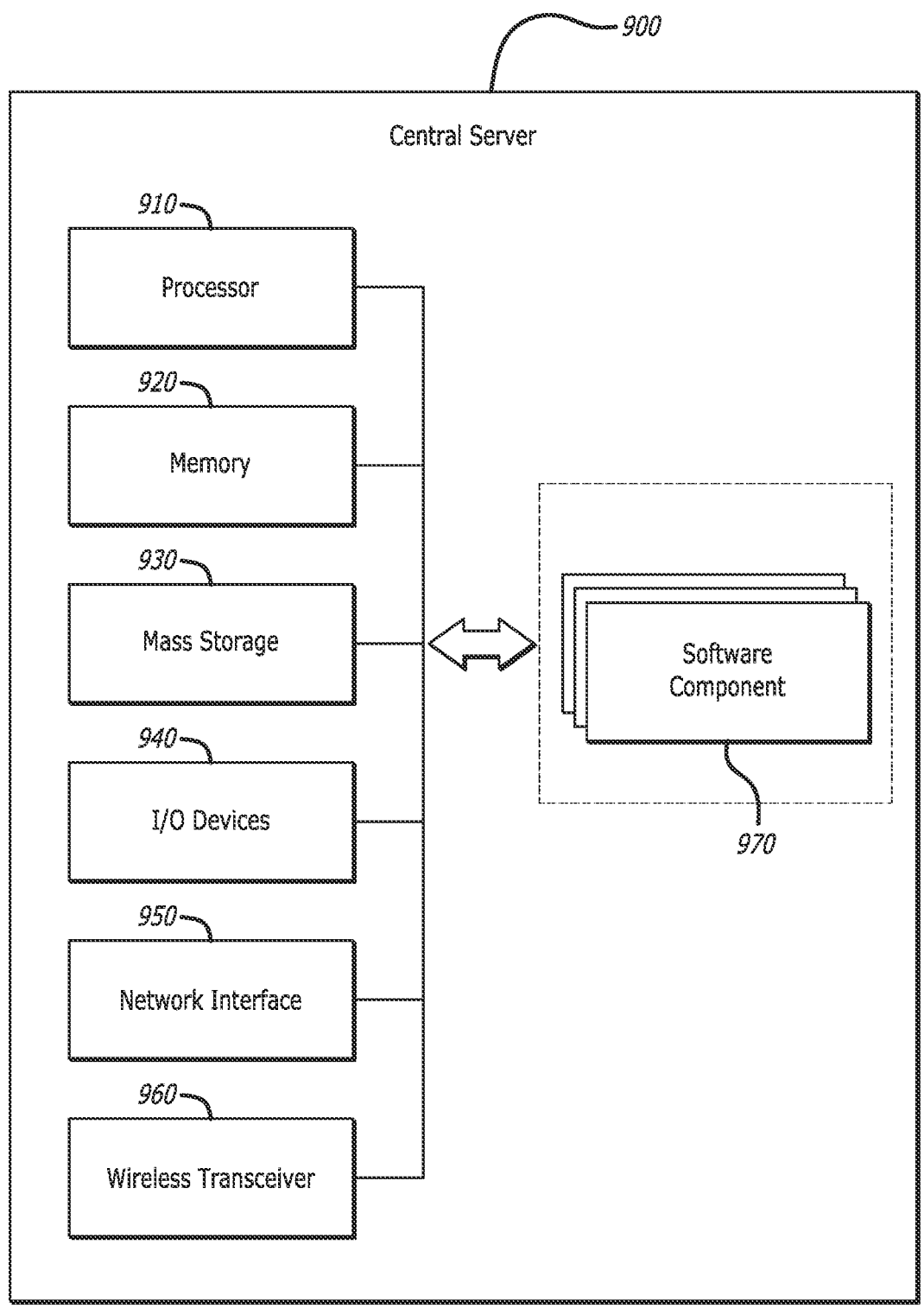
FIG. 9 is a schematic view of a central server for the real-time location system of FIG. 7.

FIG. 9 illustrates a central server 900, according to one example embodiment. The central server 900 may include at least one processor 910 and memory 920. Memory 920 stores, in part, instructions and data for execution by processor 910. Memory 920 can store the executable code when the central server 900 is in operation. The central server 900 may further include an optional mass storage device 930, one or more optional input/output (I/O) devices 940, a network interface 950, and one or more wireless transceivers 960. The components of server 900 may be connected through one or more data transport means.

Optional I/O devices 940 provide a portion of a user interface. The I/O devices 940 may include an alphanumeric keypad, such as a keyboard, for inputting alphanumeric and other information, or a pointing device, such as a mouse, a trackball, a stylus, or cursor direction keys. Additionally, the I/O devices 940 can also include displays, touchscreens, speakers, and printers. The network interface 950 may be utilized to communicate with external devices, such as client devices 770, gateway devices 740, mobile device 720 and FFR 730 via one or more data networks.

The wireless transceiver 960 may include an antenna that is separable or integral and is capable of transmitting and receiving information according to one or more wireless protocols, such as WiFi 4G, 5G, HDSPA, LTE, RF, NFC, IEEE 802.11a, b, g, n, ac, or ad, Bluetooth®, BLE, WiMAX, ect. The central server 900 may be configured to transmit information using the wireless transceiver 960 based on data and instructions stored in memory or in mass storage 930.

The components contained in the central server 900 are those typically found in computer systems, such as servers, that may be suitable for use with embodiments described herein. Thus, the central server 900 may be a server, personal computer (PC), workstation, mainframe computer, or any other computing device.

Furthermore, the central server 900 may also include one or more software components 970, which may include processor-executable code or instructions stored in the memory 920. The software components 970 may include software, middleware, or firmware enabling the operation of the central server 900 to perform operations presented above.

Figure 10:
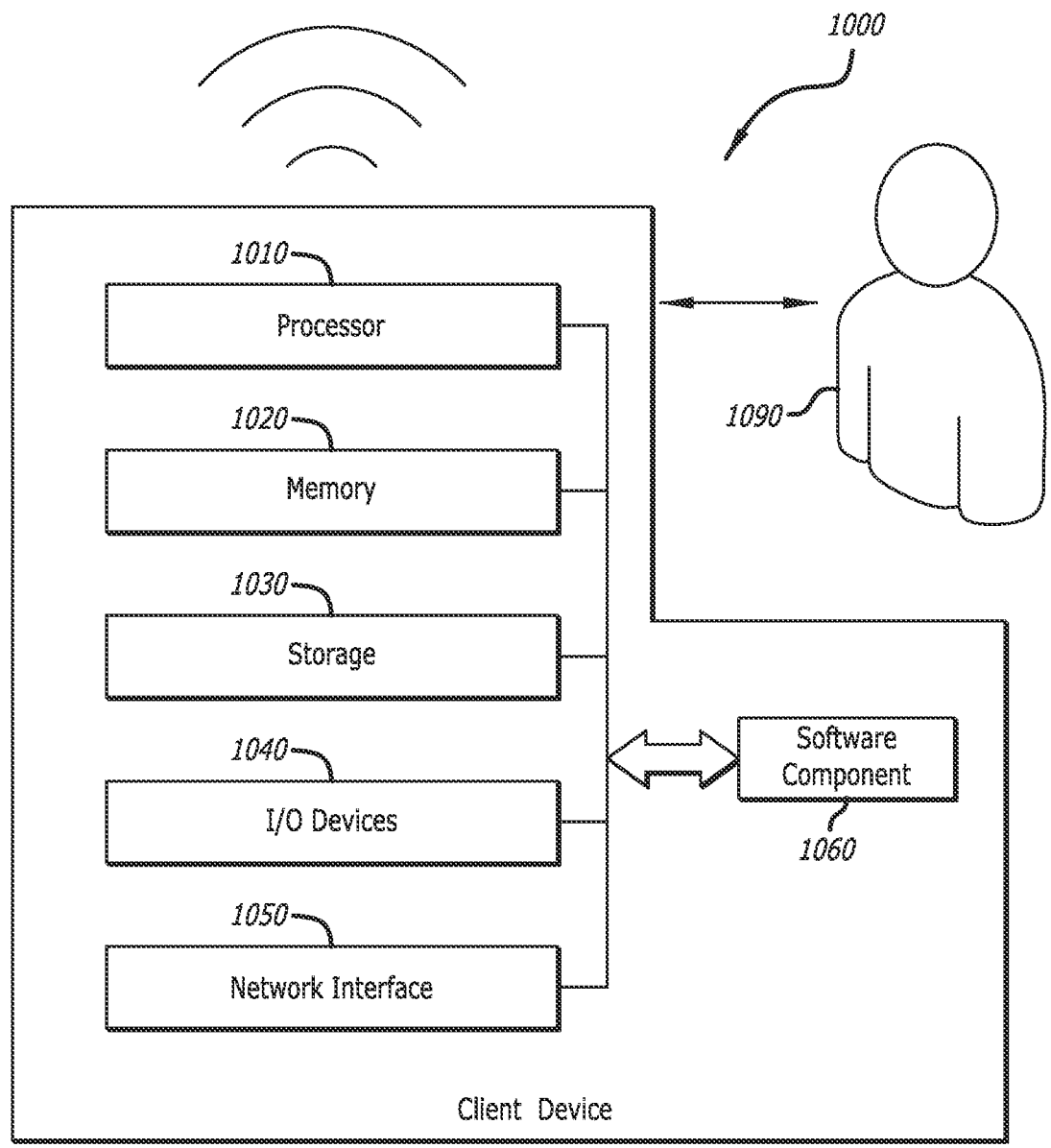
FIG. 10 is a schematic view of a client device for the real-time location system of FIG. 7.

FIG. 10 illustrates a client device 1000 used by a client 1090, according to one example embodiment. The client device 1000 may include at least one processor 1010 and memory 1020. Memory 1020 stores, in part, instructions and data for execution by processor 1010. Memory 1020 can store the executable code when the central server 900 is in operation. The client device 1000 may further include an optional mass storage device 1030, one or more optional input/output (I/O) devices 1040, and a network interface 1050. The components of client device 1000 may be connected through one or more data transport means.

The I/O devices 1040 may include an alphanumeric keypad, such as a keyboard, for inputting alphanumeric and other information, or a pointing device, such as a mouse, a trackball, a stylus, or cursor direction keys. Additionally, the I/O devices 1040 can also include a graphical user interface, displays, touchscreens, speakers, and printers. The network interface 1050 may be utilized to communicate with external devices, such as other client devices 770, gateway devices 740, mobile device 720 and FFR 730 via one or more data networks.

The components contained in the client device 1000 are those typically found in computer systems or mobile devices that may be suitable for use with embodiments described herein. Thus, the client device 1000 may be a cellular phone, smartphone, tablet, personal computer (PC), workstation, mainframe computer, or any other computing device.

Furthermore, the client device 1000 may also include one or more software components 1060, which may include processor-executable code or instructions stored in the memory 1020. The software components 1060 may include a mobile application, software, middleware, or firmware enabling the operation of the client device 1000 to perform operations presented above.

Figure 11:
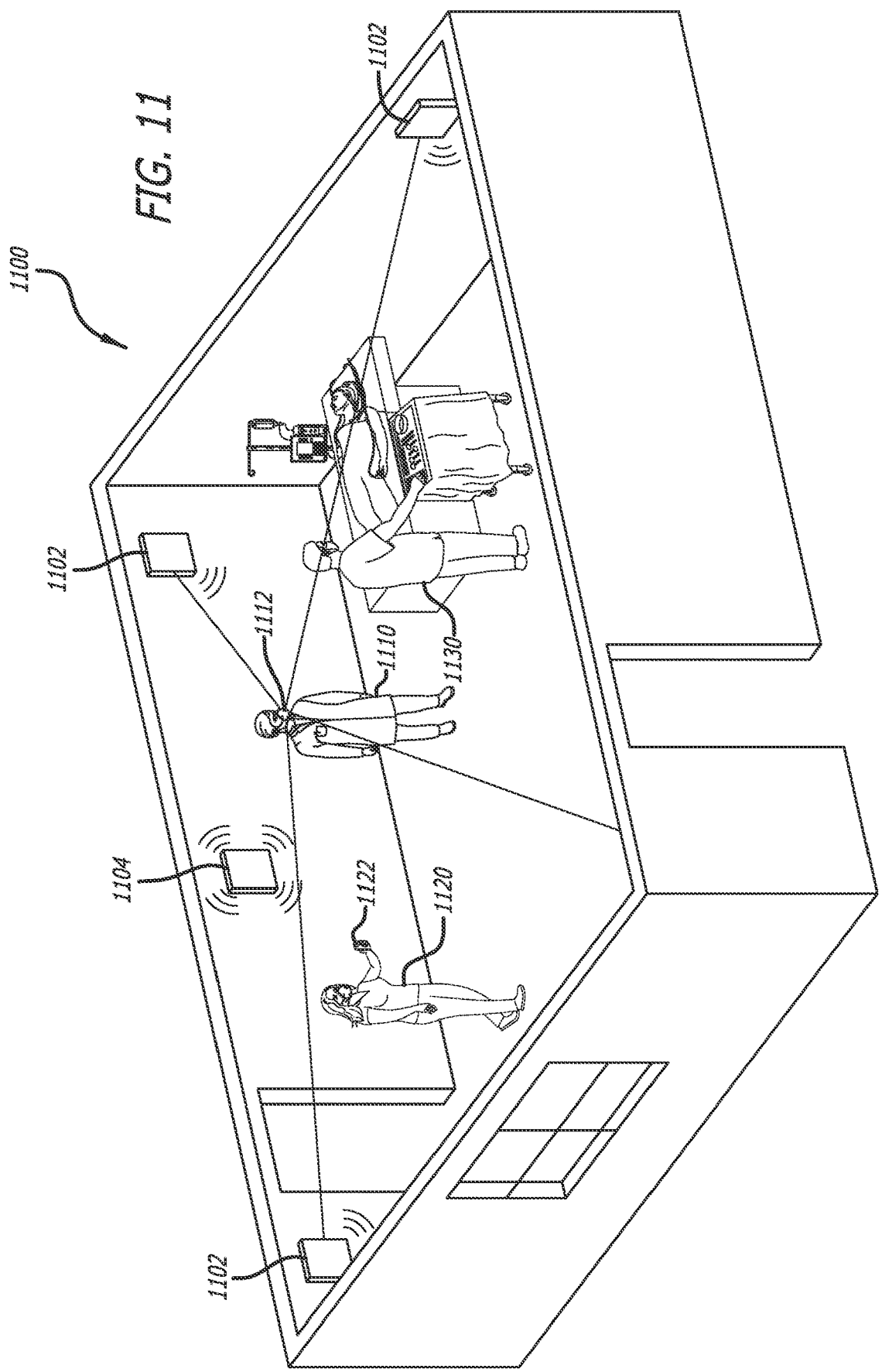
FIG. 11 is an axonometric view of an operating room within a facility.

FIG. 11 illustrates an axonometric view of an operating room 1100 within the facility 610 (FIG. 6), where a plurality of wireless signal collectors are installed at various locations throughout the room 1100. For example, as illustrated in FIG. 11, the operating room 1100 may include four wireless signal collectors 1102 secured to its walls and arranged substantially in corners of the room. Each of the wireless signal collectors 1102 has a unique identifier (ID) and geographical location, which are recorded central server database 632 (FIG. 6). The room 1100 may also include one or more access points 1104 permitting the wireless devices to connect to a LAN.

The present teachings provide for the detection and tracking of targets such as doctors 1110, nurses 1120, and other healthcare staff 1130 in the facility 610. For these ends, the wireless signal collectors 1102 perform measurements with, for example, a FFR 1112 worn by a doctor 1110, or a mobile device 1122 carried by a nurse 1120. In this example, the signal collectors 1102 are configured to communicate with a wireless tag coupled to the FFR 1112 and a transmitter of the mobile device 1122 to determine the relative location of the doctor 1110 and nurse 1120 within the operating room 1100.

The measurements can relate to the exchange or receipt of wireless signals indicating a signal strength, signal power, signal intensity, signal amplitude, signal quality, signal-to-noise ratio (SNR), or any other characteristic. Accordingly, each of the wireless signal collectors 1102 can produce sense signals, each of which include a measurement value (e.g., a RSSI value), an identifier of wireless signal collector 1102, and an identifier of mobile device 1122 or an identifier of a wireless tag coupled to the FFR 1112. The sense signals can be repeatedly generated by the wireless signal collectors 1102. For example, the sense signals are generated with intervals being in a range from about 1 millisecond to about 1,000 seconds. The sense signals are further used to determine and dynamically track the location of the doctor 1110 and nurse 1120. The location data can be further used for analytical purposes such as traffic metrics, user behaviors, moving patterns, and so forth. In other embodiments, the location data can be further used to provide the doctor 1110 and nurse 1120 with one or more messages, push notifications, medical data, and the like via the mobile device 1122, a tablet, an EKG monitor, or other electronic devices.

Figure 12:
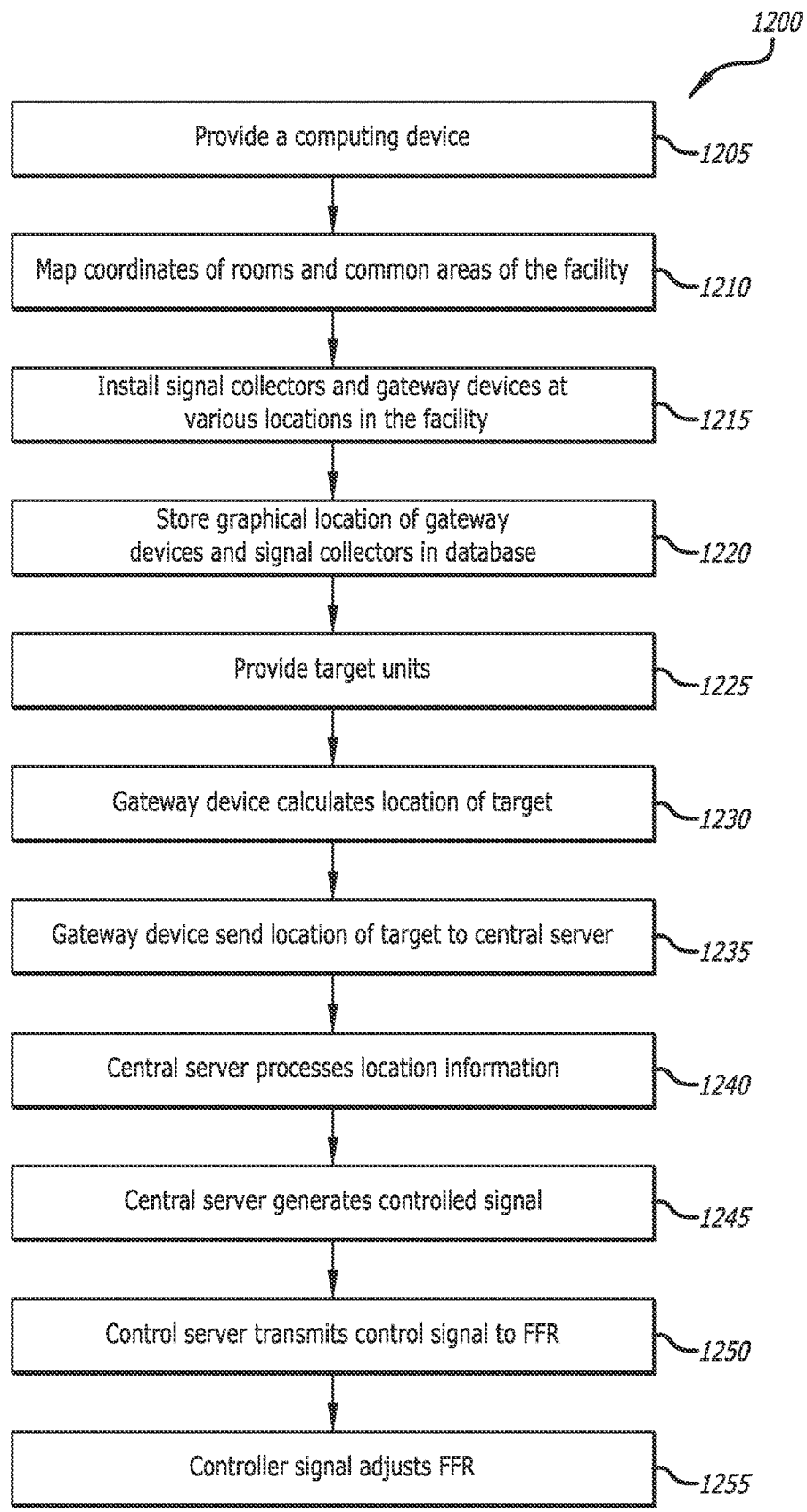
FIG. 12 is a flow diagram illustrating how a radiofrequency enabled filtering facepiece respirator is monitored and controlled using real-time location information.

FIG. 12 is a process flow diagram showing a method 1200 for managing the operation of an FFR within a facility using real-time location data, according to an example embodiment. The method 1200 may be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic that implements the method 1200 refers to the gateway device 740 and the central server 760. Notably, below recited steps of the method 1200 may be implemented in an order different than described and shown in the figure. Moreover, the method 1200 may have additional steps not shown herein, but which can be evident for those skilled in the art from the present disclosure. The method 1200 may also have fewer steps than outlined below and shown in FIG. 12.

The method 1200 commences at step 1205 with providing a computing device having a processor and storage. In the examples herein, the computing device is central server 760. The server 760 includes database 762, which is stored in the storage.

At step 1210, the geographical coordinates of various rooms and common areas of the facility are mapped and stored in database 762. For purposes of this disclosure, "mapping" is the process of converting floor plans and landscape into digital, interactive representations of indoor and outdoor spaces. Maps enable users to visualize spatial data, creating real-time location intelligence. Smart digital maps are produced by converting static maps from PDF, JPG, PNG, DWG, SVG, GeoJSON, etc. formats into intelligent, multi-dimensional digital maps by overlaying multiple data layers to create scalable, location-aware applications that are used to create location-aware Internet of Things (IoT)-enabled smart buildings. With respect to the example embodiments described herein, these maps may be integrated with customized software via APIs (application programming interfaces) and SDKs (software development kits).

At step 1215, one or more signal collectors 710 and one or more gateway devices 740 may be installed in various geographical locations within the facility. In some embodiments, the signal collectors 710 and gateway devices 740 may be mounted on the walls of the facility or, in the alternative, placed on a desk or table. As discussed above, the signal collectors 710 are in electronic communication with the gateway devices 740, and the gateway devices 740 are in electronic communication with the central server 760.

At step 1220, the geographical locations of the signal collectors 710 and gateway devices 740 installed in the facility 610 are stored in database 762. As discussed above, the database 762 may comprise information concerning the relative geographical location of each signal collector 710 and gateway device 740 within the facility, including, but not limited to, the device serial number or other identifier, the device type, the area in the facility where device is located, and the area environment.

At step 1225, one or more target units (e.g., a mobile device 720 or a FFR 730) having transmitters is provided. The target units may be carried by one or more targets (e.g., a doctor, nurse or other healthcare staff) traveling throughout the facility 610. The target unit transmitter continuously transmits signals to the signal collectors 710, where the signal collectors 710 processes the signals received from the target units and transmits geographical data to the gateway devices 740. In particular, the gateway devices 740 receive a plurality of sense signals associated with a target from the wireless signal collector 710. Each of the sense signals includes a measurement value associated with an identification of the wireless signal collector 710 and at least one of the following: an identification of a FFR 730 (with wireless tag) and an identification of a mobile device 720. The measurement value may include a characteristic of strength, power, noise, or quality of a wireless signal. For example, the measurement value may include a RSSI value. The FFR 730 or mobile device 720 may be attached to or held by the target.

At step 1230, the gateway device 740 dynamically calculates a location of the target based on the plurality of sense signals. The location can be associated with an area of the facility (e.g., an operating room) based on the identification of the wireless signal collector 710.

At step 1235, the gateway device 740 sends the location of the target to the central server 760 to cause the central server 760 to process and store the location of the target in the data storage 762. The location of the target may also becomes instantly available to view on a client device 770 via the web portal 780.

At step 1240, the central server 760 processes location information associated with a plurality of targets and compares the location information with the geographical locations of the signal collectors and the gateway devices to determine relative geographic locations of the targets within the facility 610.

At step 1245, the central server 760 generates a controller signal based on the relative geographic locations of the targets.

At step 1250, the central server 760 transmits the controller signal to the receiver 242 carried by a FFR worn by a target.

At step 1255, the controller signal adjusts the mode of operation of the FFR worn by the target. Using location data, the patency of the FFR can be optimized for user comfort and safety.

As discussed before, the controller signal adjusts the FFR between a vented mode of operation and a closed mode of operation. For example, if a target is in an operating room, the controller signal may automatically adjust, for example, the FFR 1112 worn by the doctor 1110 to the "closed" mode of operation. However, if the doctor 1110 later travels to a common walkway, the controller signal may automatically adjust the FFR 1112 to the "vented" mode of operation.

Thus, the present disclosure enables a FFR worn by a user to automatically adjust its mode of operation based on the location of the user within a facility. According to the teaching of this disclosure, the location of the user is tracked in real-time.

Figure 13:
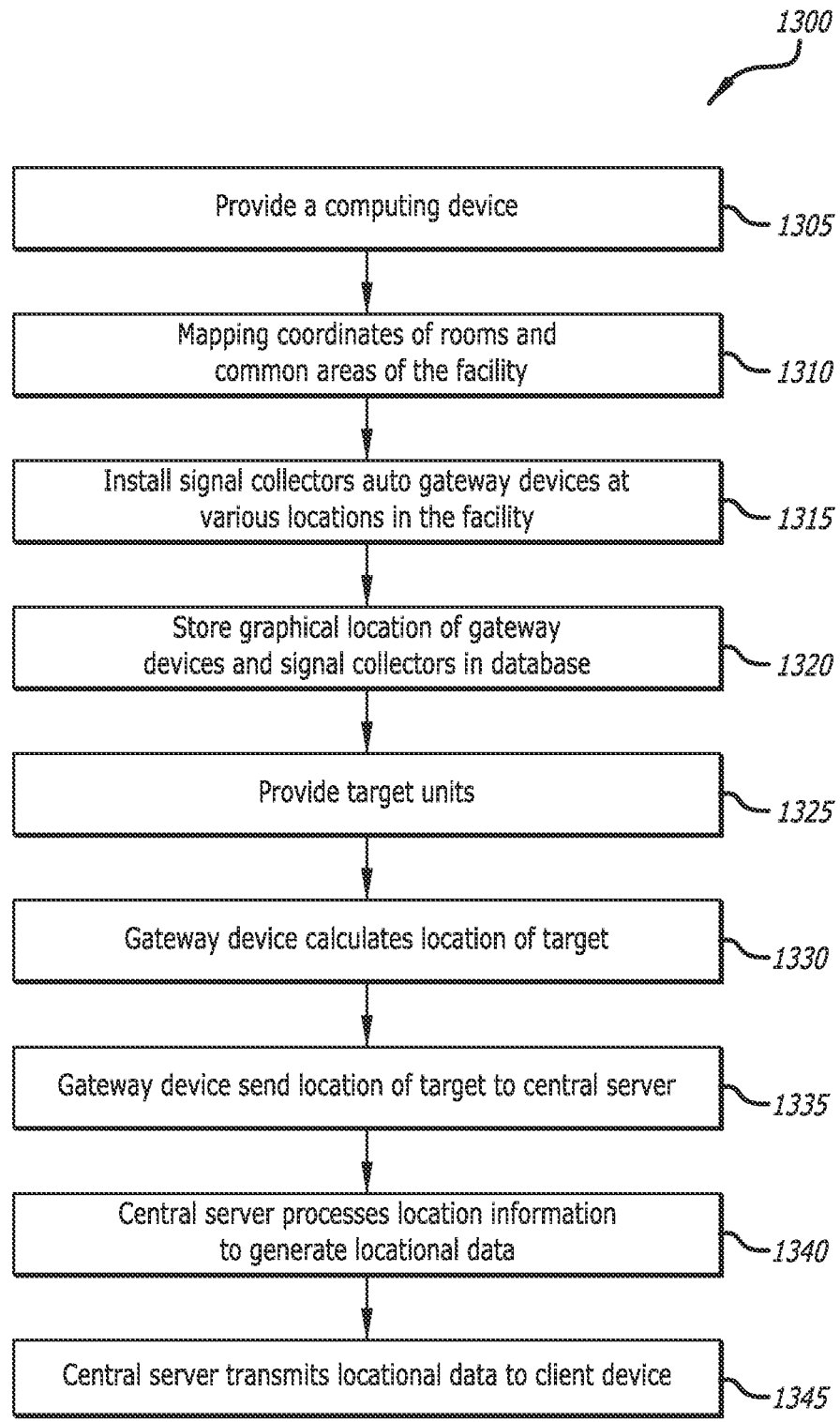
FIG. 13 is another flow diagram illustrating how a radiofrequency enabled filtering facepiece respirator is monitored and controlled using real-time location information.

FIG. 13 is a process flow diagram showing another method 1300 for managing the operation of an FFR within a facility using real-time location data, according to an example embodiment. The method 1300 commences at step 1305 with providing a computing device, such as central server 760, having a processor and storage. The server 760 includes database 762, which is stored in the storage.

At step 1310, the geographical coordinates of various rooms and common areas of the facility are mapped and stored in database 762.

At step 1315, one or more signal collectors 710 and one or more gateway devices 740 are installed in various geographical locations within the facility. The signal collectors 710 are in electronic communication with the gateway devices 740, and the gateway devices 740 are in electronic communication with the central server 760.

At step 1320, the geographical locations of the signal collectors 710 and gateway devices 740 installed in the facility 610 are stored in database 762.

At step 1325, one or more target units having a transmitter are provided. The target units are carried by one or more targets traveling throughout the facility 610. The target unit transmitter continuously transmits signals to the signal collectors 710, where the signal collectors 710 processes the signals received from the target units and transmits geographical data to the gateway devices 740. In particular, the gateway devices 740 receive a plurality of sense signals associated with a target from the wireless signal collector 710. Each of the sense signals includes a measurement value associated with an identification of the wireless signal collector 710 and at least one of the following: an identification of a FFR 730 (with wireless tag) and an identification of a mobile device 720. The measurement value can include a characteristic of strength, power, noise, or quality of a wireless signal. For example, the measurement value include a RSSI value. The FFR 730 or mobile device 720 may be attached to or held by the target.

At step 1330, the gateway device 740 calculates a location of the target based on the plurality of sense signals. The location can be associated with an area of a facility based on the identification of the wireless signal collector 710.

At step 1335, the gateway device 740 sends the location of the target to the central server 760 to cause the central server 760 to process and store the location of the target in the data storage 762. The location of the target may also becomes instantly available to view on a client device 770 via the web portal 780.

At step 1340, the central server 760 processes location information associated with a plurality of targets to generate statistical data. At step 1345, the central server 760 transmits the locations data via web portal 780 to a GUI or dashboard of the client device 770 to display one or more visual representations of the real-time location data of the targets.

The location coordinates characterize the current geographical location of the target within the area of the facility. The location coordinates can be delivered to the central server 760, the data storage 762, or web portal 780 for further processing.

Based on the location data displayed on the GUI or dashboard of the client device 770, a user may manually adjust a filtering facepiece respirator worn by the user, as described in co-pending patent application Ser. No. 17/462,351, the entire contents of which are incorporated by reference. By using SDKs for websites, iOS and Android, custom web and mobile applications may be developed. These custom applications may function alone or be integrated into an existing platform. Such applications allow the FFR wearer to receive information regarding the conditions of the respirator and control his or her own valve or have an assistant control the respirator remotely.

Bio-Sensor

Figure 14:
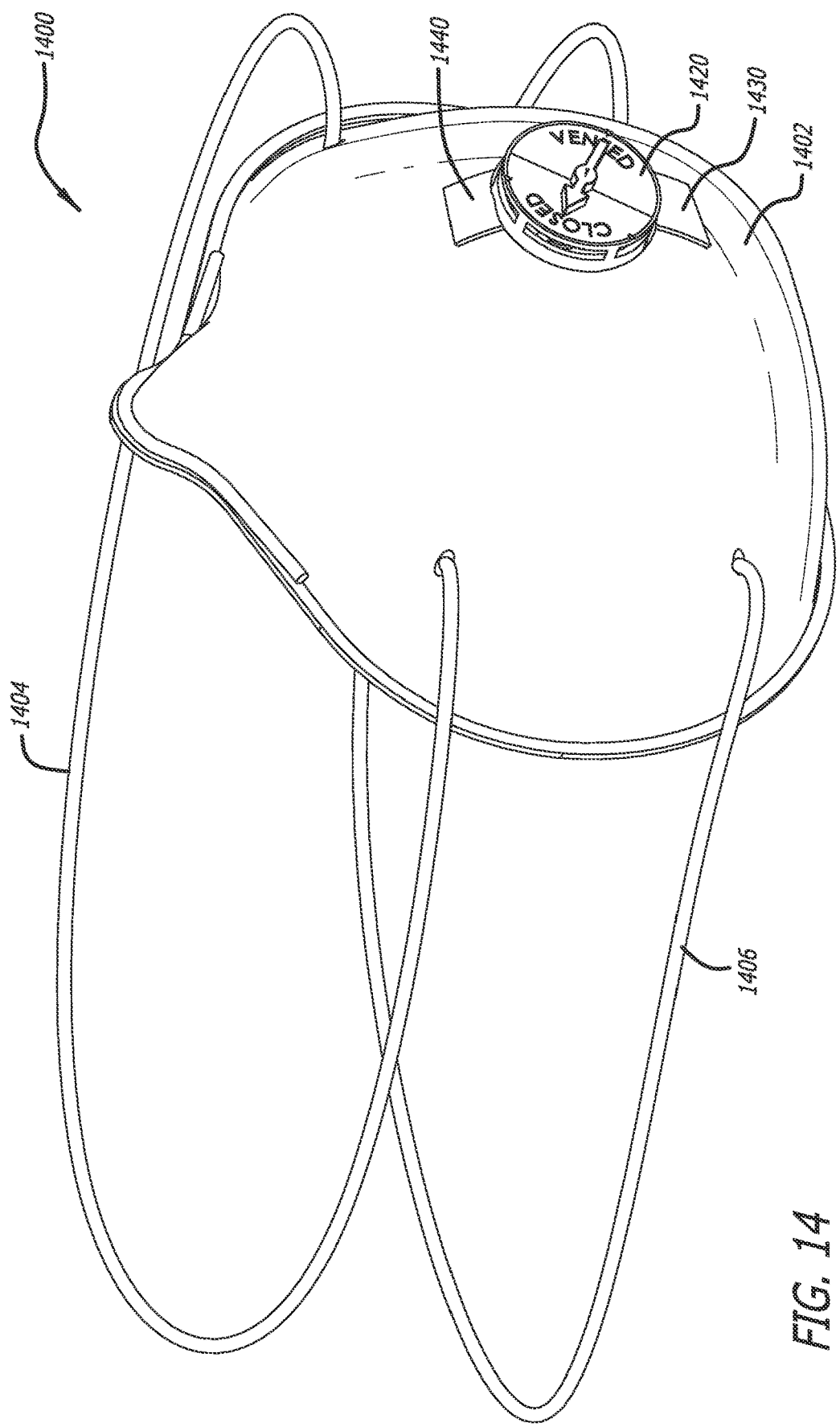
FIG. 14 is a perspective view of an example of a biosensor-controlled filtering facepiece respirator in accordance with the teachings of the present disclosure.

In other implementations of the disclosure, the filtering facepiece respirator may be monitored and controlled by a bio-sensor. FIG. 14 is a perspective view of another example of a filtering facepiece respirator 1400 according to the teaching of the present disclosure. As shown, the facepiece respirator 1400 may include a facemask 1402, an upper harness 1404 coupled to an upper portion of the face mask 1402, a lower harness 1406 coupled to a lower portion of the facemask 1402, a respiratory valve 1420 coupled to a central front portion of the face mask 1402, a bio-sensor 1430, and a controller 1440. For purposes of simplicity, the facemask 1402, upper harness 1404, and lower harness 1406 may be constructed similar to the facemask 102, upper harness 104, and lower harness 106 of facepiece respirator 100, thus, the details of these components will not be described further.

In this example, the respirator 1400 is outfitted with a bio-sensor 1430 to monitor carbon dioxide and/or oxygen levels. The bio-sensor 1430 may be placed either inside of the respiratory valve or outside the valve, as shown in FIG. 14. Measuring carbon dioxide and oxygen levels outside the valve measures the composition of air being delivered to the wearer. Measuring carbon dioxide and oxygen levels inside the valve measures the composition of air coming out of the lungs and mixing with that coming through the respirator. The air trapped between the face and valve is rebreathed repeatedly. Over time, the levels of oxygen decrease and the levels of carbon dioxide increase causing hypoxemia and hypercapnia. The normal concentration of oxygen in the air is 20.9% at sea level and 19.4% at 2000 ft. (609 meters). OSHA lists that breathing air with an oxygen concentration below 19.5% as oxygen-deficient and unhealthy. Feedback can be given to the user regarding these critical parameters. If there is a dangerous buildup of carbon dioxide or a drop in oxygen being inhaled, an alert can be sent to the mask wearer. The software can also monitor user compliance of wearing the mask to the institution's accepted rules and regulations while on duty. Other metrics can be easily added by customizing the hardware and software.

One example of a person using such a mask would be a nurse working in a non-mapped medical setting. While in an area deemed infectious, the mask valve would be completely closed, allowing only filtered air to enter and leave. As the nurse moves around to less contaminated areas or is taking a work break, the valve may be opened manually or remotely via a wireless connection controlled by the mask wearer or his or her assistant. Another example of a person using such a mask would be a nurse working in a mapped medical setting. In a mapped medical setting, the valve could be opened and closed based on programming and development of geospatially accurate maps by the medical center, hospital or clinic. While in an area deemed infectious, the mask valve would be completely closed allowing only filtered air to enter and leave. As the nurse moves around to less contaminated areas or is taking a work break, the valve could be opened automatically via the RF connection. In both scenarios, there would be an increase in airflow to the nurse when deemed safe to help combat the deleterious effects of hypoxemia and hypercapnia.

Using location data, patency of the valve can be optimized for user comfort and safety. Biosensors coupled to the FFR may be used to monitor vital user credentials and parameters including, but not limited to, oxygen concentration, carbon dioxide concentration, and tidal volume. The system may be configured so alerts may be sent to a target or client unit from the central server if a credential or parameter has been violated and the mode of operation of the FFR valve may be adjusted manually or remotely. Further, alerts can be sent via the RF functionality if a credential or parameter has been violated and the valve settings of the FFR may be automatically adjusted.

Figure 15:
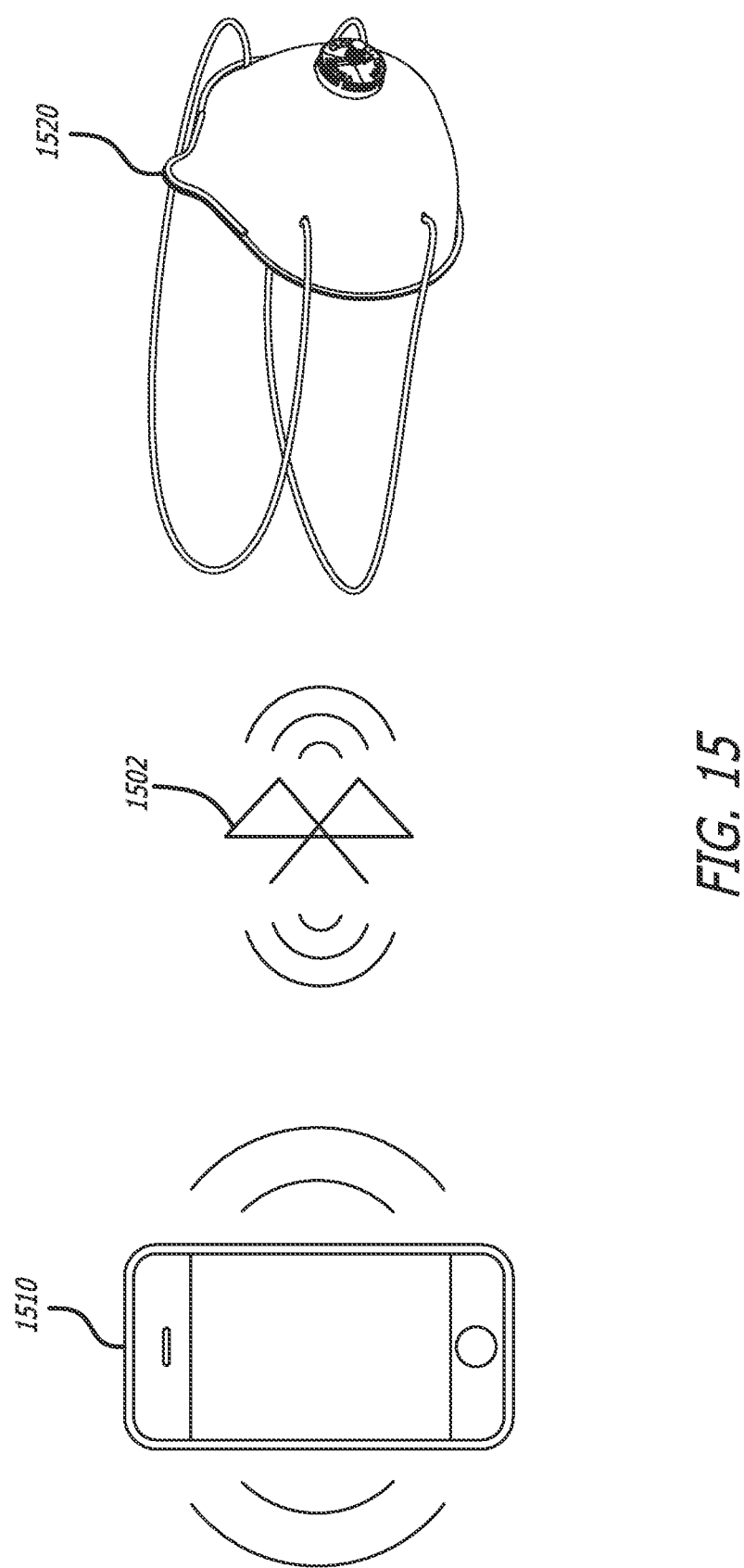
FIG. 15 is a schematic view illustrating how a mobile device may communicate with a radiofrequency enabled filtering facepiece respirator according to the teachings of the present disclosure.

FIG. 15 illustrates a Bluetooth Low Energy (BLE) connection 1502 between a mobile device 1510 and an RF-enabled filtering facepiece respirator 1520. The mobile device 1510 has a customized mobile application that provides critical information about the conditions of the mask to the user. Both the mobile device 1510 and the filtering facepiece respirator 1520 have Bluetooth chipsets but any RF technology could be utilized. Intramask bio-sensors monitor vital user credentials and parameters, including but not limited to oxygen concentration, carbon dioxide concentration, and tidal volume. Alerts can be sent to the mobile device 1510 via the Bluetooth connection 1502 if a credential or parameter has been violated and adjustments can be made to the respirator. The mask body can have no valve, a non-adjustable valve, a manually adjustable valve, or a valve that can be adjusted remotely. In a mask with no valve, the mask could be removed if the bio-sensors detect a buildup of carbon dioxide within the mask. In a valved mask, the valve could be opened manually or remotely if the bio-sensors detect a buildup of carbon dioxide within the mask.

Accordingly, a system and method for monitoring a filtering facepiece respirator using real-time location data have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The present invention may be implemented in various embodiments, namely, manual, automatic, or a combination of manual and automatic. While the present invention depicts a screw mechanism to open and close the valve, there are many other potential methods that could be utilized. For example, instead of a screw, the hubs may be advanced and retracted along a rod utilizing a push or pull mechanism. In other embodiments, the hubs may be translated by other sliding or rotating mechanisms.

In some embodiments, the filtering facepiece respirator may also include smart bio-sensors that detect and measure intra-mask oxygen saturation levels, carbon dioxide levels, nucleic acid levels, the volume of expired or inspired air, as well as detect air leakage from the facemask. In these embodiments, the smart sensors may report data to a central processing unit, where the central processing unit uses the smart sensor data to alert the user of a change in mask environment conditions.

Other embodiments may be fitted with RF technology that provides communication between the respirator and a mobile device or central processing unit to control the respirator's mode of operation. In these embodiments, the controller may be integrated for use within public spaces such as offices, hospitals, clinics, senior care and other healthcare facilities, laboratory, restaurants, public and private buildings, service businesses, gyms and health clubs, and retailers.

In some embodiments, the entire respirator may be discarded. In other embodiments, the filtering layer material may be replaceable. In other embodiments, the respiratory valve may be replaceable while the facemask is preserved.

While the embodiments described in the present disclosure teach respiratory valves generally having annual-shaped construction, other respiratory valves and components according to the teachings of the present disclosure may include square-spaced, triangular-shaped, pentagon-shaped, or other geometrical-shaped constructions.

In general, terms such as "coupled to," and "configured for coupling to," and "secured to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

Although the previous description illustrates particular examples of various implementations, the present disclosure is not limited to the foregoing illustrative examples. A person skilled in the art is aware that the disclosure as defined by the appended claims and their equivalents can be applied in various further implementations and modifications. In particular, a combination of the various features of the described implementations is possible, as far as these features are not in contradiction with each other. Accordingly, the foregoing description of implementations has been presented for purposes of illustration and description. Modifications and variations are possible in light of the above description.

What is claimed is:

1. A filtering facepiece respirator and system comprising: a facemask adapted to fit over the nose and mouth of a wearer, the facemask comprising a mask body containing a filtering structure;
   a harness coupled to the mask body for securing the facemask on the face of the wearer;
   a mechanical valve coupled to a portion of the mask body proximate the wearer's mouth, the valve being adjustable between a first mode of operation and a second mode of operation, where in the first mode of operation air is permitted to flow through the valve on exhalation but not on inhalation and in the second mode of operation air is obstructed from flowing through the valve on exhalation and inhalation;
   a battery electronically coupled to the mechanical valve;
   a wireless tag electronically coupled to the battery; and
   a controller electronically coupled to the battery and the mechanical valve, the controller being in wireless communication with a server having a processor and database;
   the system comprising:
   one or more wireless signal collectors, a gateway device, the server, and a facility;
   where the wireless tag is configured to communicate measurement data with the one or more wireless signal collectors disposed at various locations within the facility, the one or more wireless signal collectors generating sense signals that are communicated to the gateway device to determine the geographical location of the filtering facepiece respirator within the facility, and
   where the gateway device is configured to communicate with the server to transmit the geographic location information to the server, and
   where the server is configured to communicate with the controller based on the geographic location of the filtering facepiece respirator, and
   where the controller is configured to transmit a controller signal to the mechanical valve to adjust the valve between the first mode of operation and the second mode of operation based on the geographic location of the filtering facepiece respirator within the facility.

2. The filtering facepiece respirator and system of claim 1, where the processor comprising a database of coordinates corresponding to a floorplan of the facility.

3. The filtering facepiece respirator and system of claim 1, where the mask body comprises a first porous layer and a filtering layer.

4. The filtering facepiece respirator and system of claim 1, where the mask body comprises a first porous layer, a second porous layer, and a filtering layer, where the filtering layer is disposed between the first porous layer and the second porous layer.

5. The filtering facepiece respirator and system of claim 1, where each sense signal includes a measurement value associated with a particular filtering facepiece respirator, an identifier of a particular filtering facepiece respirator, and an identifier of the wireless signal collector.

6. The filtering facepiece respirator and system of claim 1, where the valve comprises a valve housing having an interior chamber, a fixed hub member disposed within the chamber, a movable hub member disposed within the chamber, a pliable diaphragm disposed between the fixed hub member and the movable hub member, and a screw member disposed within the chamber extending along a longitudinal axis of the valve housing, the screw member being threadedly coupled to the movable hub member such that when the screw member is rotated about the longitudinal axis, the threaded engagement between the screw member and the movable hub member causes the movable hub member to translate axially along the longitudinal axis away from or towards the fixed hub member.

7. The filtering facepiece respirator and system of claim 6, where in the first mode of operation the movable hub member is spaced apart from the fixed hub member, thus permitting an outer periphery of the diaphragm to be urged away from the fixed hub member under positive pressure and air is allowed to freely flow through the valve when the wearer exhales.

8. The filtering facepiece respirator and system of claim 6, where the outer periphery of the diaphragm is drawn towards the fixed hub member under negative pressure to obstruct the flow of air through the valve when the wearer inhales.

9. The filtering facepiece respirator and system of claim 6, where in the second mode of operation the movable hub member abuts the fixed hub member to secure the diaphragm therebetween, thus retaining an outer periphery of the diaphragm in contact with the fixed hub member to create a seal therebetween that obstruct air from flowing through the valve when the wearer exhales or inhales.

10. The filtering facepiece respirator and system of claim 6 further comprising a valve cap indicator coupled to a front portion of the valve housing, the valve cap indicator comprising a plate of material inscribed with indicia indicating the state of airflow through the valve utilizing a colored indicator, label, light indicator, auditory system, or display.

11. The filtering facepiece respirator and system of claim 6, where the diaphragm is made of a material that filters microscopic particulates.

12. The filtering facepiece respirator and system of claim 1, where the controller is controlled by a mobile device via Bluetooth, WiFi, cellular, ultra-wideband, or RFID communications.

13. The filtering facepiece respirator and system of claim 1 further comprising smart sensors that detect oxygen saturation levels, carbon dioxide levels, nucleic acid levels, and volume of expired or inspired air.

14. The filtering facepiece respirator and system of claim 13, where the smart sensors report data to a central server.

15. The filtering facepiece respirator and system of claim 14, where the central server can use the smart sensor data to alert the user of a change in mask environment conditions.

16. A method of managing the operation of a filtering facepiece respirator within a facility, the method comprising:
providing a computing device having a processor and storage, where a database is stored in the storage;
mapping the geographical coordinates of various rooms and common areas of the facility and storing the geographical coordinates in the database;
installing one or more signal collectors and one or more gateway devices in various geographical locations within the facility, where the one or more signal collectors are in electronic communication with the one or more gateway devices, and where the one or more gateway devices are in electronic communication with the computing device;
storing in the database the geographical locations of the one or more signal collectors and the one or more gateway devices installed within the facility;
providing one or more target units having a transmitter, where the one or more target units are carried by one or more targets traveling throughout the facility, and where the transmitter continuously transmits to the one or more signal collectors electromagnetic waves carrying messages or electronic signals, and where the one or more signal collectors processes the messages or electronic signals it receives from the one or more target units and transmits geographical data to the one or more gateway devices, and where the one or more gateway devices routes the geographical data to the computing device;
processing the geographical data in the computing device and comparing the geographical data with the geographical locations of the one or more signal collectors and the one or more gateway devices stored in the database to determine relative geographic locations of the one or more targets within the facility;
generating a controller signal in the computing device based on the relative geographic locations of the one or more targets; and
transmitting the controller signal from the computing device to a receiver carried by a filtering facepiece respirator worn by the one or more targets, where the controller signal adjusts the mode of operation of the filtering facepiece respirator.

17. The method of claim 16, where the controller signal adjusts the operation of the filtering facepiece respirator between a first mode of operation where air is permitted to flow through the valve on exhalation but not on inhalation and a second mode of operation where air is obstructed from flowing through the valve on exhalation and inhalation.

* * * * *